US011521083B2

(12) United States Patent
Johnston et al.

(10) Patent No.: US 11,521,083 B2
(45) Date of Patent: Dec. 6, 2022

(54) APPARATUS AND AMENDMENT OF WIND TURBINE BLADE IMPACT DETECTION AND ANALYSIS

(71) Applicant: Oregon State University, Corvallis, OR (US)

(72) Inventors: Matthew Johnston, Corvallis, OR (US); Robert Albertani, Corvallis, OR (US); Congcong Hu, Corvallis, OR (US); William Gage Maurer, Corvallis, OR (US); Kyle Clocker, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 419 days.

(21) Appl. No.: 16/741,638

(22) Filed: Jan. 13, 2020

(65) Prior Publication Data
US 2020/0226480 A1 Jul. 16, 2020

Related U.S. Application Data

(60) Provisional application No. 62/792,319, filed on Jan. 14, 2019.

(51) Int. Cl.
*G06N 5/04* (2006.01)
*G06N 20/00* (2019.01)
(Continued)

(52) U.S. Cl.
CPC ............... *G06N 5/04* (2013.01); *F03D 17/00* (2016.05); *G01H 1/003* (2013.01); *G01J 5/00* (2013.01);
(Continued)

(58) Field of Classification Search
CPC .......... G06N 5/04; G06N 20/00; G06N 20/10; F03D 17/00; G01H 1/003; G01H 11/08;
(Continued)

(56) References Cited

U.S. PATENT DOCUMENTS 8,511,177 B1   8/2013  Shaw
2009/0266160 A1* 10/2009 Jeffrey ................... F03D 17/00
                                                              73/455
(Continued)

FOREIGN PATENT DOCUMENTS

WO  WO-2014024303 A1 *  2/2014 ............. F03D 17/00
WO     2016029135        2/2016

OTHER PUBLICATIONS

Bailey, H. et al., "Assessing environmental impacts of offshore wind farms: lessons learned and recommendations for the future", Aquatic Biosystems; vol. 10, No. 8, 2014. 13 pages.
(Continued)

*Primary Examiner* — James J Yang
(74) *Attorney, Agent, or Firm* — Mughal IP P.C.

(57) ABSTRACT

A multisensory system provides both temporal and spatial coverage capacities for auto-detection of bird collision events. The system includes an apparatus having a first circuitry to capture and store a series of images or video of a blade of a wind turbine; and a memory to store the images from the first circuitry. The apparatus also has one or more sensors to continuously sense vibration of the blade or for acoustic recordings; and a second circuitry to analyze the sensor data stream and/or the series of images or video to identify a cause of the vibration and to trigger the camera(s). A communication interface transmits data from the second circuitry to another device, wherein the second circuitry applies artificial intelligence or machine learning to control sensitivity of the one or more sensors.

17 Claims, 24 Drawing Sheets

(51) Int. Cl.
*F03D 17/00* (2016.01)
*H04N 7/18* (2006.01)
*G01H 1/00* (2006.01)
*G01J 5/00* (2022.01)
*G06V 20/52* (2022.01)

(52) U.S. Cl.
CPC .............. *G06N 20/00* (2019.01); *G06V 20/52* (2022.01); *H04N 7/188* (2013.01); *G01J 2005/0077* (2013.01)

(58) Field of Classification Search
CPC .... G01J 5/00; G01J 2005/0077; G06V 20/52; G06V 20/38; H04N 7/188; F05B 2270/334; F05B 2270/8041; G06K 9/6269; G06K 9/00536
See application file for complete search history.

(56) References Cited

U.S. PATENT DOCUMENTS

| | | | |
|---|---|---|---|
| 2010/0132137 A1* | 6/2010 | Eggleston | B08B 1/02 15/21.1 |
| 2011/0077990 A1* | 3/2011 | Storage | G06Q 10/087 705/7.41 |
| 2011/0192212 A1 | 8/2011 | Delprat et al. | |
| 2013/0050400 A1 | 2/2013 | Stiesdal et al. | |
| 2013/0052010 A1 | 2/2013 | Nielsen et al. | |
| 2015/0010399 A1 | 1/2015 | Bahat et al. | |
| 2016/0100086 A1* | 4/2016 | Chien | H04N 5/23206 348/143 |

OTHER PUBLICATIONS

Bassett, K. et al., "Vibration response of a 2.3 mw wind turbine to yaw motion and shut down events", Wind Energy; vol. 14, No. 8; pp. 939-952 2011.

Boser et al., "A training algorithm for optimal margin classifiers", In: Haussler D (ed.) Proceedings of the 5th annual Workshop on Computational Learning Theory (COLT '92); Pittsburgh, PA, USA: ACM Press, pp. 144-152; 1992.

Brabant, R. et al., "Towards a cumulative collision risk assessment of local and migrating birds in north sea offshore wind farms", Hydrobiologia; 756 (1): 63-74; 2015.

Cristianini, N., "Support Vector Machines", In: An Introduction to Support Vector Machines: and Other Kernel-Based Learning Methods. Cambridge, New York: Cambridge University Press. Chapter 6. 32 pages.

Fijn et al., "Bird movements at rotor heights measured continuously with vertical radar at a dutch offshore wind farm", International Journal on Avian Science; IBIS 157 (3): 558-566; 2015.

Korner-Nievergelt, F. et al., "Estimating bat and bird mortality occurring at wind energy turbines from covariates and carcass searches using mixture models", PLOS ONE 8 (7); 2013.

Kumar, A. et al., "Time-frequency analysis and support vector machine in automatic detection of defect from vibration signal of centrifugal pump", Measurement 108: 119-133; 2017.

Sovacool, B., "Contextualizing avian mortality: A preliminary appraisal of bird and bat fatalities from wind, fossil-fuel, and nuclear electricity", Energy Policy; 37 (6); 2241-2248; 2009.

\* cited by examiner

APPARATUS AND AMENDMENT OF WIND TURBINE BLADE IMPACT DETECTION AND ANALYSIS

CLAIM FOR PRIORITY

This application claims the benefit of priority of U.S. Provisional Patent Application No. 62/792,319, filed Jan. 14, 2019, and titled "WIND TURBINE BLADE IMPACT DETECTION AND ANALYSIS," and which is incorporated by reference in entirety.

ACKNOWLEDGEMENT OF GOVERNMENT SUPPORT

Embodiments of this invention were made with government support under Award No. DE-EE0005363 and DE-EE0007885 awarded by the Department of Energy. The government has certain rights in the invention.

BACKGROUND

In recent years, wind energy generation is experiencing rapid worldwide development. In coming decades, wind energy generation will play a significant role in overall power generation. In the United States, the National Renewable Energy Laboratory (NREL) estimates a total gross offshore wind energy potential of 4150 gigawatts (GW).

As a component of renewable energy, wind energy generation has been growing at a fast pace in recent years due to its low cost and high availability. Although the environmental impact associated with the usage of fossil fuel can be reduced by the clean alternative energy source, the deployment of an increased number of wind facilities with larger scale turbines generates wildlife concerns for volant species such as birds and bats, mainly due to their collisions with wind turbine blades.

For example, the deployment of offshore wind farms brings environmental concerns such as interactions with marine life, increased noise, alterations to food resources, and disturbance to the seabed. One of the major ecological concerns is the potential threat to marine bird species due to collisions with wind turbines. Studies of bird and bat mortality rates for collisions with utility-scale wind turbines have reported an estimate of up to 40 deaths per turbine per year on certain sites. It is imperative that the development of offshore wind facilities include efforts to minimize negative impact on bird and bat species, especially those that are listed as endangered or threatened.

BRIEF DESCRIPTION OF DRAWINGS

The embodiments of the disclosure are understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
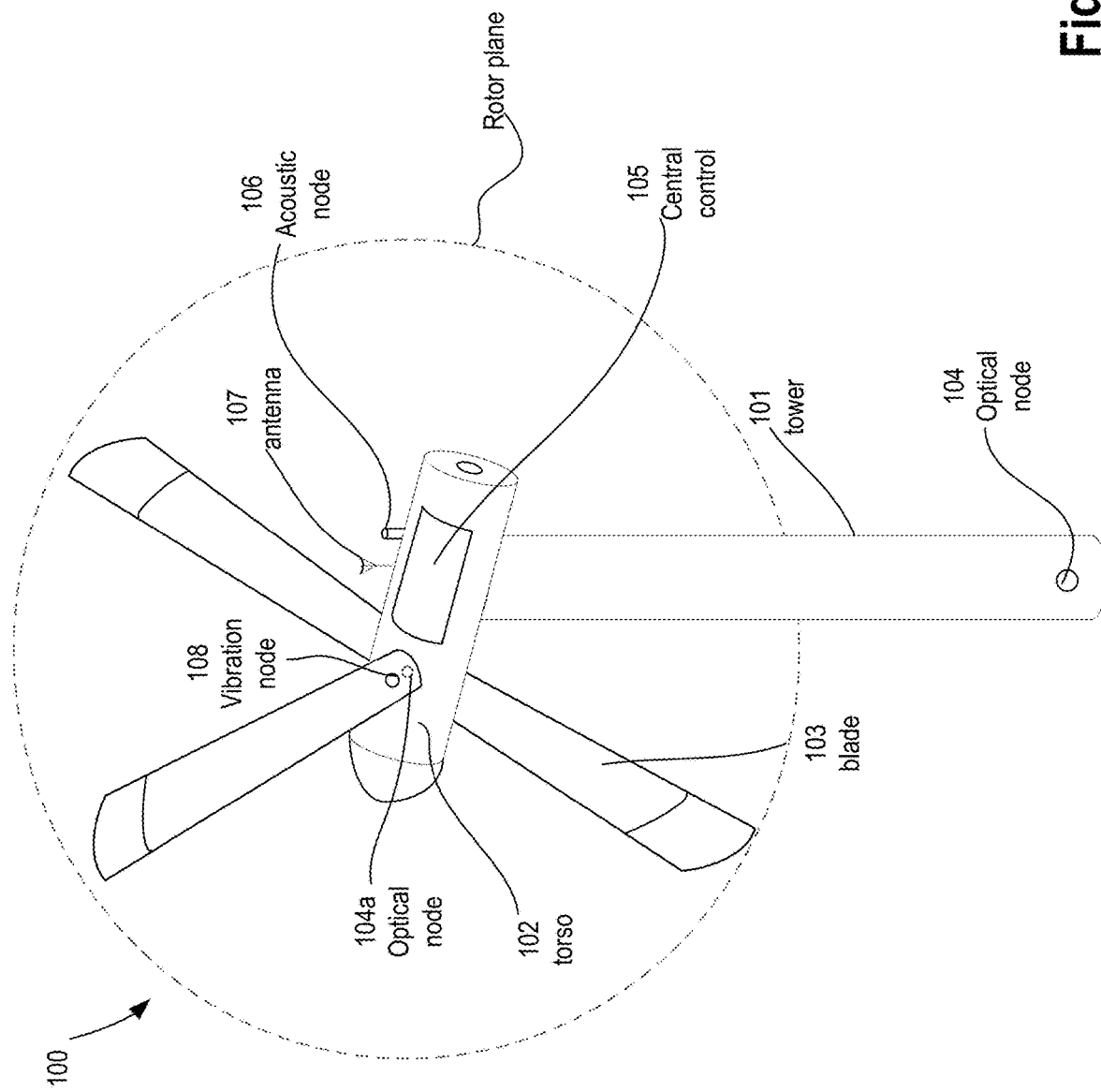
FIG. 1 illustrates a wind turbine including an auto-detect system with event-driven trigger architecture, in accordance with some embodiments.

Common methodologies applied at land-based wind farms for bird and/or bat collision assessments and mortality rate monitoring, carcass survey and long-term visual observation, are made generally at the scale of a single wind farm. Due to surveyor efficacy and carcass removal by scavengers, the count could be inaccurate, and the true magnitude of the problem could be underestimated. Most importantly, carcass surveys are expensive or infeasible at some sites, such as agricultural fields, dense shrub habitats, remote locations, and offshore. Common methodologies used to estimate potential interactions with offshore wind facilities are visual surveys (e.g., aerial and boat based), radar monitoring, and acoustic recordings that can inform collision risk models based on flux data. Although these methodologies are powerful tools for the assessment of displacement effects of local birds and barrier effects of the wind farms on birds during migration, they are poorly suited for directly monitoring collision events with wind turbines. Hence, effective and low-cost methods of collision event monitoring are required.

One approach for automatic detection of bird and/or bat collision with wind turbines is abnormal event monitoring by the implementation of vibrational or acoustic sensing devices. Vibration-based monitoring techniques are well-developed and widely adopted by modern wind turbines for rotating parts (e.g., blades, bearings, and gearbox). Vibration sensors such as piezoelectric transducers and accelerometers are commonly installed on wind turbines for the analysis of dynamic structural response during operations. However, such an approach alone is not enough to detect abnormal event monitoring.

Another approach, video surveillance (in either visual or infrared spectrum), also is widely used by avian species monitoring systems. One notable infrared-based monitoring system is the Thermal Animal Detection System, which was developed and applied to identify species through wing beat analysis and animal size. However, its collision detection function is not automatic, and a manual review of all collected imagery is required to assess the interactions of volant species with wind turbines.

Some embodiments disclose a multisensory system that provides both temporal and spatial coverage capacities for auto-detection of bird collision events. The system includes an apparatus having a first circuitry to capture and store a series of images or video of a blade of a wind turbine; and a memory to store the images from the first circuitry. In some embodiments the apparatus comprises logic to record or capture images or video from the first circuitry. The apparatus also has one or more sensors to continuously sense vibration of the blade or for acoustic recordings. The apparatus further comprises a second circuitry to analyze the sensor data stream to identify a cause of the vibration and to trigger the camera(s). A communication interface transmits data from the second circuitry to another device, wherein the second circuitry applies artificial intelligence or machine learning principles to control sensitivity of the one or more sensors. In some embodiments, the first circuitry includes one or more of a visual camera or infrared camera. The visual camera or infrared camera may be installed on a blade of the turbine. In some embodiments, the apparatus is a battery to power the first circuitry, the second circuitry, memory, one or more sensors, and the communication interface. In some embodiments, the apparatus comprises a power supply connected with the wind turbine's power system. In some embodiments, the one or more sensors include one or more of: 3-axis accelerometer, piezoelectric contract microphone, gyroscope, or one or more sensors for acoustic recordings. The communication interface includes one of a Bluetooth, Wi-Fi, 5G, or LTE. In some embodiments, the one or more sensors include a vibration sensor, which is to trigger the first circuitry to capture the image.

In some embodiments, one or more cameras are positioned on each blade of the wind turbine such that the cameras can see objects striking the blade surface. In some embodiments, these cameras are always looping video (e.g., the cameras are not permanently recording video to memory). The various sensors on the blade and/or the tower base measure vibration, acoustic, accelerometer, and/or gyro-meter signals in/on the blade. The apparatus then monitors these sensors and uses them via an algorithm to determine in real time when an object likely struck the blade. If a blade impact is determined to be likely, the most recent camera video frames are stored, so that a user could analyze the images to see what struck the blade.

This algorithm of various embodiments can use machine learning, statistical analysis, or any other artificial intelligence approach, or it could just perform baseline impact detection. In some embodiments, the algorithm looks at the video stream in real time to determine when to trigger image or video capture, instead of or in conjunction with the other sensor signals. In some embodiments, video files are recorded for offline analysis (e.g., analysis in the cloud). In some embodiments, object recognition is also added to the algorithm.

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described, but are not limited to such.

FIG. 1 illustrates wind turbine 100 including an auto-detect system with event-driven trigger architecture, in accordance with some embodiments. Wind turbine 100 comprises a tower base 101, torso 102, blades 103, optical node 104, central control 105, acoustic node 106, antenna 107, and vibration node 108. Optical node 104, central control 105, acoustic node 106, antenna 107, and vibration node 108 together form a multisensory system. This multisensory system provides both temporal and spatial coverage capacities for auto-detection of bird collision events (or collision of other flying objects). Some embodiments describe the efficacy of the multisensory system using field testing. Testing details such as device positioning and sensor selection on the application of two main types of integrated vibration sensors (e.g., accelerometer and contact microphone) are discussed. Artificial collision events are created by launching tennis balls into moving blades using compressed-air cannon.

In some embodiments, optical node 104 may include visual and/or infrared cameras aiming at the rotor plane (e.g., blades 103). Information from optical node 104 is transmitted by optical (e.g., optical fiber) or non-optical means (e.g., non-optical wires or wireless transmitters) to central control 105 for further processing. In some embodiments, acoustic node 106 comprises a bioacoustics sensor that senses peculiar sounds attributed to flying objects. In some embodiments, acoustic node 106 is counted outside the nacelle or torso 102. Nacelle or torso 102 comprises a cover housing that houses all of the generating components in the wind turbine, including the generator, gearbox, drive train, and brake assembly. In some embodiments, antenna 107 is used to transmit information gathered by the various sensors. Antenna 107 can also receive data or control signals to control operation of the wind turbine or the sensors. Antenna 107 may comprise one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, Antenna(s) 107 are separated to take advantage of spatial diversity.

In some embodiments, vibration sensor node 108 is installed on the root of blade 103. The root of blade 103 is closer to torso 102 than the wider tip of bade 103. In some embodiments, vibration sensor node 108 includes accelerometers and contact microphones to detect any unusual collision to blade 103. In various embodiments, central control 105 comprises data acquisition system. The data acquisition system may include one or more processors that analyze data gathered by sensors 104, 106, and 108. The one or more processors are communicatively coupled to antenna 107. In some embodiments, data acquisition system is embedded in the nacelle or torso 102.

In various embodiments, vibration sensors 108 provide continuous vibration monitoring, while the optical node 104 and acoustic node 106 acquire necessary information (e.g., visual images, impact sounds, and animal calls) for event confirmation and species recognition when an impact is detected. Here, continuous monitoring is substantially or completely uninterrupted monitoring unlike periodic monitoring. Since continuous data acquisition by optical node 104 at frame rates sufficient to capture fast-moving objects will produce a prohibitory volume of data to be archived, requiring massive post processing, the event-driven trigger architecture is developed to address this challenge, in accordance with some embodiments.

In some embodiments, each node (e.g., 104, 106, and 108) continuously streams data into a ring buffer for temporary storage. The ring buffer may be part of central control 105. When an event (e.g., collision) is registered by vibration node 108, all buffers store data in an operator-determined time window (e.g., equal temporal period of temporal data on both sides of a triggered event), and eventually, all buffered data is asynchronously stored in memory. This architecture minimizes the volume of data archived and enhances efficiency of data post processing.

In some embodiments, the sensing of blade vibrations is tasked as the primary triggering source for image acquisition and impact confirmation. In some embodiments, two different sensors for the same function are provided to confidently determine the impact on the blades. The two sensors are (1) wireless 3-axis accelerometers (e.g., by LORD MicroStrain G-Link LXRS w/ 104-LXRS base station) and (2) wireless contact microphones (e.g., by Sun-Mechatronics USK-40 w/ UZ-10UHFreceiver). Two per blade, these sensors form the vibration node, providing continuous structural vibration monitoring and collision event trigger in the event-driven architecture. However, the embodiments are not limited to two sensors per blade. Additional sensors or a single sensor per blade can also be used so long as the sensor(s) can ascertain with high degree of confident (e.g., greater than 90%) any impact of an external object to blade 103.

In some embodiments, each blade also includes an optical node 104a. In some embodiments, optical node 104a is positioned near the base of blade 103 to view the entire length of blade 103. In some embodiments, optical node 104a is positioned near the tip (wide side) of blade 103 to view the entire blade 103 towards torso 102. In various embodiments, optical node 104a continuously streams data like other nodes discussed herein. In some embodiments, optical node 104a includes one or more of a visual camera, or an infrared camera. In some embodiments, one or more optical nodes can be placed on either side of blade 103. These optical nodes can be placed near the tip and/or the base of blade 103.

Figure 2:
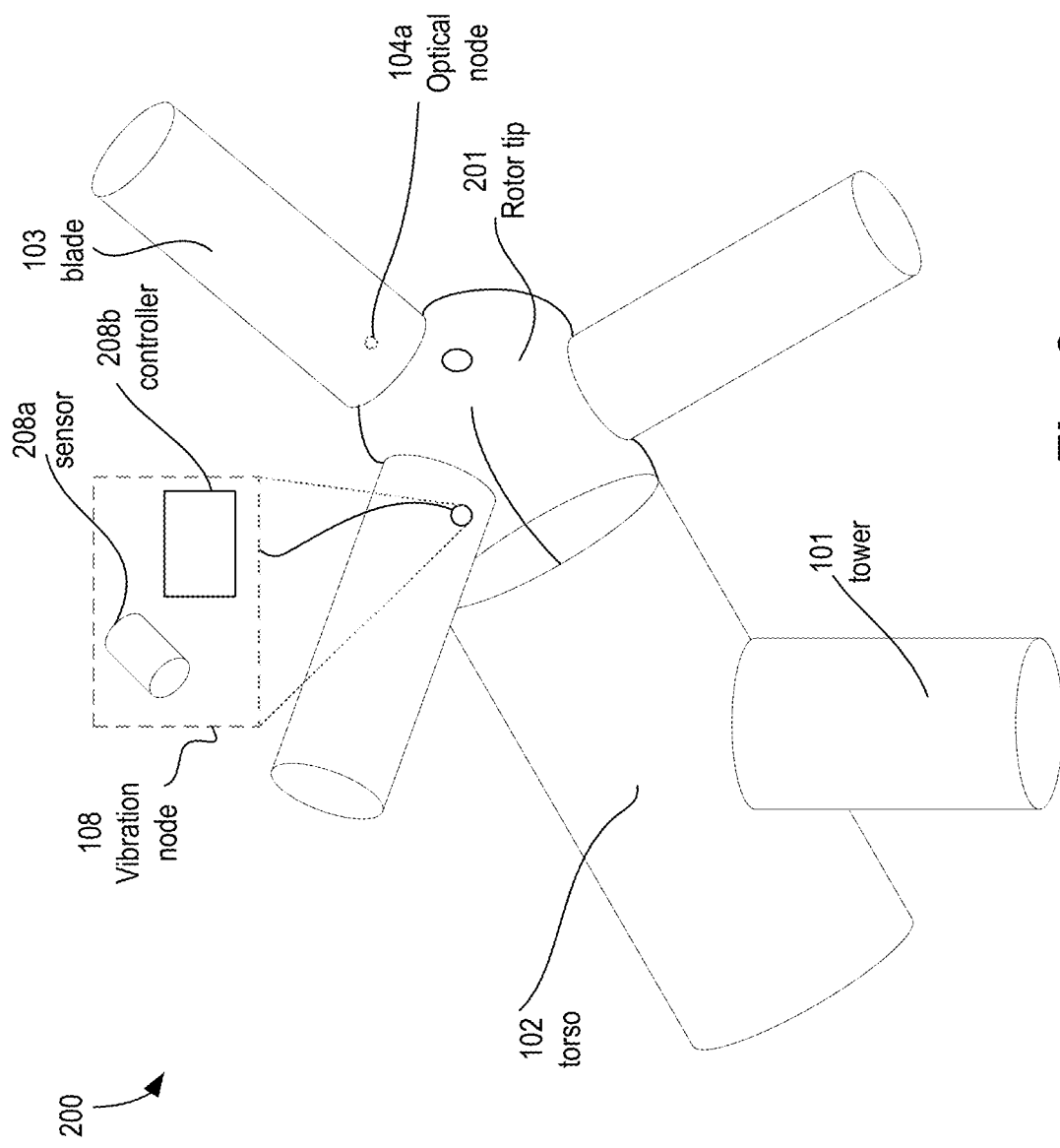
FIG. 2 illustrates a view having a vibration sensor placement near a base of a blade of the wind turbine, in accordance with some embodiments.

FIG. 2 illustrates view 200 of vibration sensor 108 placement near a base of blade 103 of wind turbine 100, in accordance with some embodiments. Sensor node 108 may include a module having the actual sensor 208a and an associated controller 208b. Controller 208b may be any suitable microcontroller to gather data from sensor 208a and/or to calibrate sensor 208a.

Figure 3:
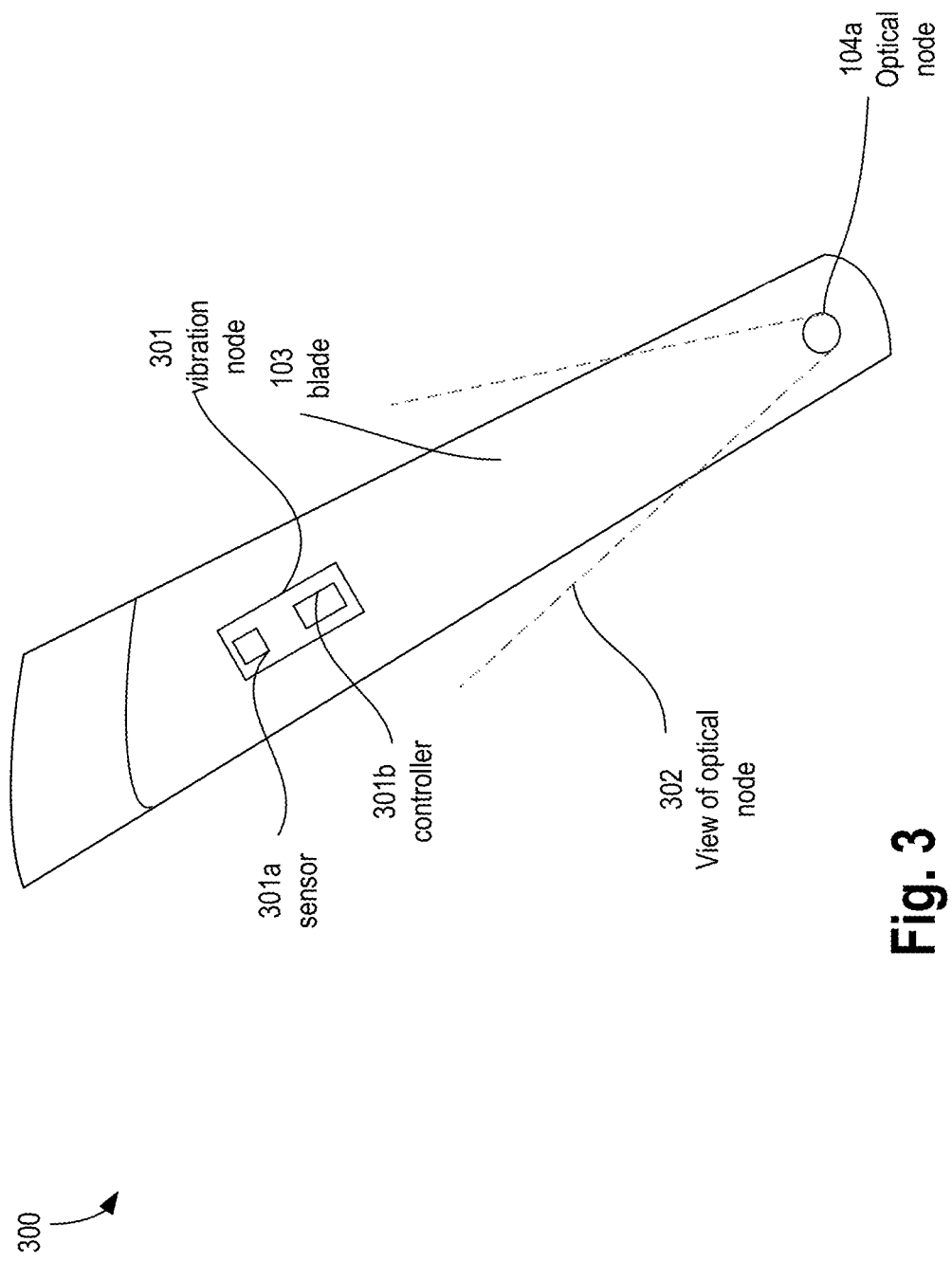
FIG. 3 illustrates a view having a vibration sensor placement near a tip of the blade of the wind turbine, in accordance with some embodiments.

FIG. 3 illustrates view 300 vibration sensor placement near a tip of the blade of the wind turbine, in accordance with some embodiments. In contrast to or in addition to having the vibration node 106 near the base of blade 103, vibration node can also be placed near the wider tip of blade 103. One such vibration node 301 comprises sensor 301a and associated controller 301b. In some embodiments, controller 301b communicates with controller 208b to determine jointly whether an object hit bade 103. In various embodiments, vibration nodes 108 and/or 301 are embedded in blade 103 and do not degrade the aerodynamic nature of blade 103. The sensors of vibration nodes 108 and/or 301 are covered in a weatherproof housing, in accordance with various embodiments. View 300 also shows an optical node 104a near the base of blade 103. Optical node 104a has a viewing area 302 that covers the entire surface of blade 103. In some embodiments, multiple optical nodes 104a are placed on the same surface of blade 103. For example, one optical node 104a is at the base of blade 103 and another optical node (not shown) is at the wider tip of blade 103. In some embodiments, optical nodes 104a are placed on both surfaces of blade 103 to view both surfaces of blade 103 for any collision or potential collision of an object.

In some embodiments, to attach the sensors to blade 103, the blade surface is cleaned at the application location, and the housing box is applied to the surface with proper orientation (e.g., one axis parallel to the longitudinal axis of the blade using 3M double bonding tape). The accelerometer signal is digitized prior to wireless transmission, while the contact microphone signal is transmitted as an analog signal and is digitized at the receiver station. In some embodiments, an analog-to-digital converter (ADC) is used to digitize the accelerometer signal. ADCs are apparatuses that convert continuous physical quantities (e.g., voltages) to digital numbers that represent the amplitude of the physical quantities. Any suitable ADC may be used for digitizing the accelerometer signal. For example, the ADC is one of: direct-conversion ADC (for flash ADC), two-step flash ADC, successive-approximation ADC (SAR ADC), ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC.

Here, an analog signal is any continuous signal for which the time varying feature (variable) of the signal is a representation of some other time varying quantity, i.e., analogous to another time varying signal. The term digital signal generally refers to a physical signal that is a representation of a sequence of discrete values (a quantified discrete-time signal), for example of an arbitrary bit stream, or of a digitized (sampled and analog-to-digital converted) analog signal.

In some embodiments, the receiver station comprises paired wireless receivers that are placed inside the nacelle 102 next to central controller 105. For timely processing of data for real-time collision monitoring, sampling rates at 512 Hz for accelerometers and 1000 Hz for contact microphones are used, for example. However, other sampling rates can be used as well.

In some embodiments, bioacoustics node 106 comprises of an acoustic microphone (e.g., G.R.A.S. general-purpose electronic piezoelectric microphone with frequency range of 10 to 20 000 Hz). The microphone is placed on top of nacelle 102. In addition to species audio identification, it is valuable for environmental assessment that might lead to missed or false impact triggers (e.g., rain and lightning). In one example, no avian vocalizations are recorded due to the short timeframe of the testing, and merely acoustic recordings of turbine operation associated with an impact trigger used to trigger the system are collected. In this example, an integrated bioacoustics node 106 is used as an extra source of trigger.

The implementation of optical cameras 104 involves the tradeoff between target resolution and field of view. In general, wider field of view results in lower target resolution. In some embodiments, target pixel density simulation model finds the proper camera deployment location.

Figure 4:
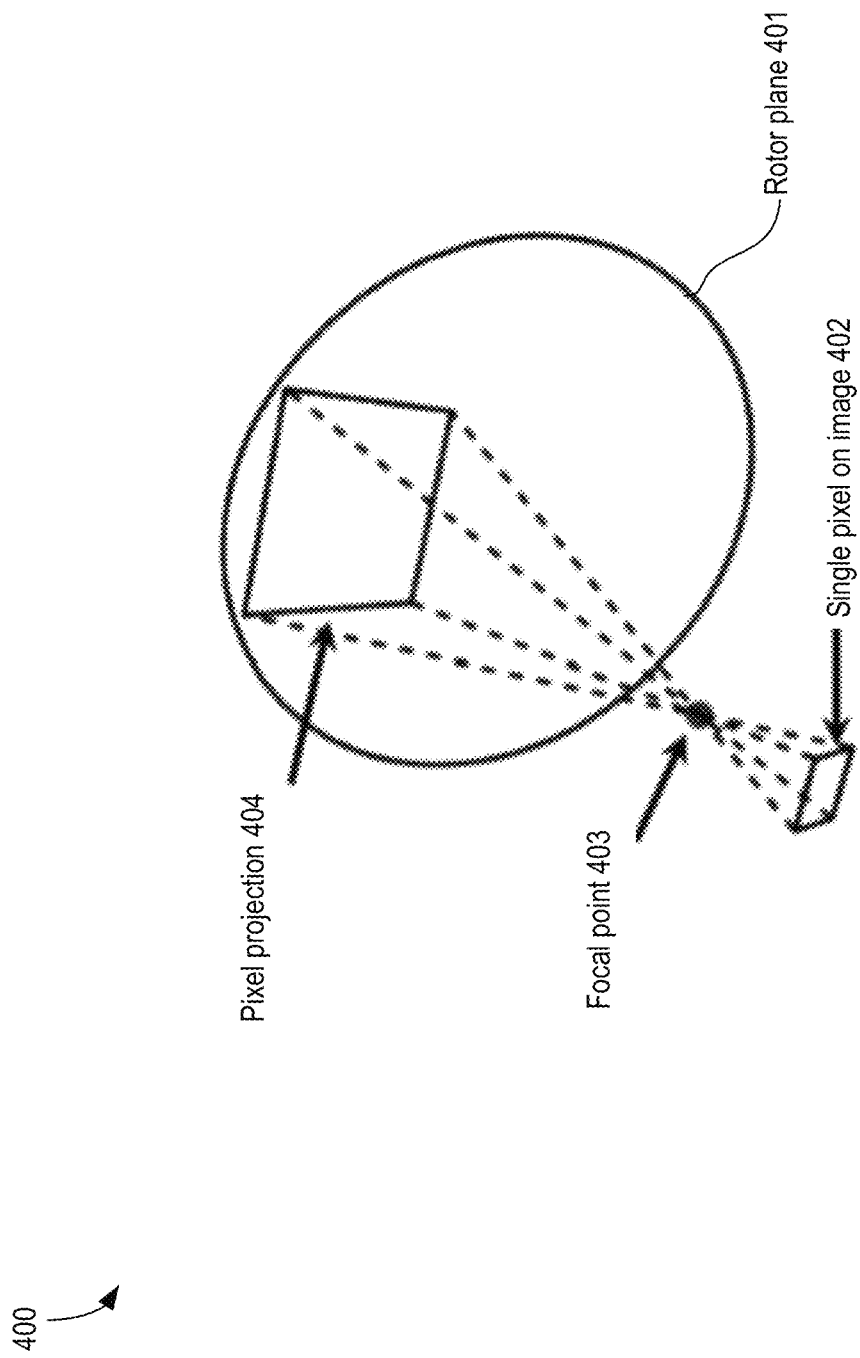
FIG. 4 illustrates a pixel-mapping scheme, in accordance with some embodiments.

FIG. 4 illustrates pixel-mapping scheme 400, in accordance with some embodiments. Scheme 400 includes a rotor plane 401, pixel on image 402, focal point 403, and pixel projection 404. With known camera specifications (e.g., effective focal length 403, sensor size, and image resolution), position (e.g., distance from camera to the rotor plane), and orientation, each pixel on the image 402 is projected (e.g., mapped) onto the rotor plane 401 using trigonometric functions, as illustrated in FIG. 4.

For a given physical dimension on rotor plane 401, the target resolution can be estimated as the sum of pixel pitches for all correlated pixels. In some embodiments, three options of optical node configurations are provided—(1) on nacelle or torso 102, with a field of view that intersects rotor plane 401; (2) on turbine tower 101, near its base, in an upward-facing configuration (as shown in FIG. 1); and (3) on an adjacent tower, viewing the entire rotor plane. In some embodiments, the visual camera (e.g., Currera-R RL50C-OC) is deployed near the tower base with an upper angle of view targeting the blade rotor plane, due to the short testing timeframe.

In some embodiments, subcomponent functions and overall system functionality, reliability, and accuracy is validated in field tests with operating wind turbines and simulated bird impacts on the blades. In one example, two locations for tests are selected for availability of wind turbines not involved in commercial energy conversion and for the excellent technical and logistic support on site. Partial system early tests are performed at the North American Wind Research and Training Center (NAWRTC) at the Mesa lands Community College in Tucumcari, N. Mex. The Center operates a General Electric GE 1.5 MW wind turbine. Later tests on the fully integrated system are performed at the NREL National Wind Technology Center (NWTC) in Boulder, Colo. The turbine used at the NWTC is a 600 kW CART3 (3 blades). In both cases, bird impacts are simulated by launching tennis balls using a custom compressed-air launcher, as illustrated in FIG. 5.

Figure 5:
FIG. 5 illustrates a picture of an air cannon used to launch tennis balls to mimic bird impacts at NREL-NWTC. NREL, National Renewable Energy Laboratory; NWTC, National Wind Technology Center.

FIG. 5 illustrates picture 500 of an air cannon used to launch tennis balls to mimic bird impacts at NREL-NWTC. NREL, National Renewable Energy Laboratory; NWTC, National Wind Technology Center. The cannon is barreled to the size of a regular tennis ball, and it is possible to launch one or two balls simultaneously. Three avian species (e.g., 2 offshore, 1 onshore) of regulatory concern include the marbled murrelet (*Brachyramphus marmoratus*), the shorttailed albatross (*Phoebastria albatrus*), and golden eagle (*Aquila chrysaetos*). They reflect a wide variety in body length and weight of 24 cm and 202 g for the murrelet, 70 cm and 3600 g for golden eagle, to 91 cm and 4680 g for the albatross. Specific bat species that are investigated include the hoary and silver-haired bats. They have body length of 11 to 15 cm and weight of 10 to 30 g. All species can fly at speeds up to 45 km/h or more. When considering the impact kinetics, it is more likely that a bird and/or bat may be hit by the leading edge of a blade than the animal running into the rapidly moving face of the blade (up to 250 km/h or more). Additionally, the tennis balls are launched from ground and flying in a parabolic trajectory before hit by the blade. Therefore, the impact kinetics is more a function of the object mass and the blade speed. In this example, the tennis ball mass is 57 g without water, and 140 g when filled with water, which is comparable to small birds or large bats. In addition, tennis balls for testing are easy to launch and make no damage to the blade. Launch direction in reference to the rotor are downwind in the case of NAWRTC and upwind in the case of NREL-NWTC.

Due to varying wind conditions, low impact rate, and short timeframe of field-testing, a limited number of collision events are created and recorded. During field-testing, the ring buffer duration is set for 10 seconds before and after impact of the tennis ball. In one example, recordings are manually triggered to ensure that data is collected for later examination and post processing. Field notes of visually observed impact events including time, position of impact, blade status, and weather conditions are taken and matched with output data acquired from each sensor node. Typical accelerometer and contact microphone data post processing include (1) first stage with visual inspection of time histories for quality control purposes and for event detection, and (2) second-stage processing including numerical signal analysis.

In this example, a total of 23 dynamic impact (e.g., tennis balls hitting moving blades) events are successfully obtained at NAWRTC, and six are obtained at NWTC under wind turbine normal operating condition (i.e., rotor at designed speed, generator engaged). The higher impact rate at NAWRTC are primarily caused by more favorable wind conditions. Likewise, four additional dynamic impact events are recorded at NWTC under turbine idle operation (i.e., blade free spinning, generator not engaged) due to low wind occurrence. The signal-to-noise ratio (SNR) is defined as follows:

$$SNR = 20\text{Log}_{10} \frac{A_{impact}}{A_{noise}} \quad (1)$$

where A is the root mean square (RMS) amplitude and is calculated and evaluated for all impacts.

Figure 6:
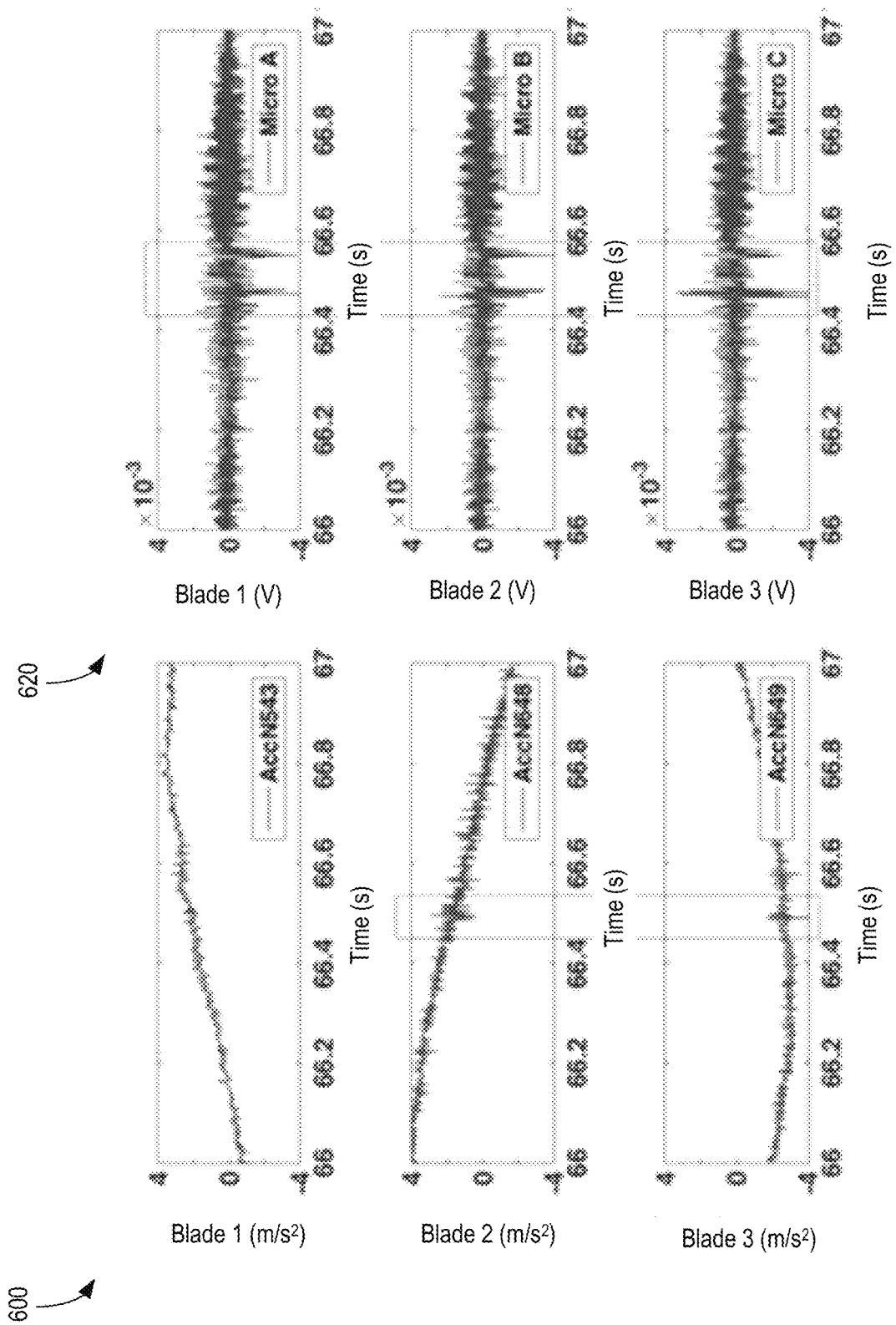
FIGS. 6A-B illustrate sample time history plots showing vibration data collected by 6 sensors (2 sensors per blade, 3 blades) from a single impact event on blade at the North American Wind Research and Training Center (NAWRTC) for, A) accelerometers and B), contact microphones, respectively, in accordance with some embodiments.

FIGS. 6A-B illustrates sample time history plots showing vibration data collected by 6 sensors (2 sensors per blade, 3 blades) from a single impact event on blade at the North American Wind Research and Training Center (NAWRTC) for, A) accelerometers (plots 600) and B), contact microphones (plots 620). These plots show a sample of the six time histories vibration data (2 sensors per blade, 3 blades) collected at NAWRTC, which results from a single impact of a tennis ball on one blade. Signals from accelerometers are shown in FIG. 6A, with sensors labeled Acc. N543, N648, and N649, respectively. Signals from the three contact microphones are shown in FIG. 6B, with the sensors labeled Micro A, B, and C.

Although the ball is struck by one blade in this example, it is evident from the figure that two accelerometers and all three contact microphones pick up the impact, demonstrating the generally higher sensitivity to impact detection of contact microphones. In this case, however, the wireless transmission protocol for the accelerometers is seen more reliable than the contact microphones, resulting in an unpredictable and relevant loss of data for the latter system. Therefore, the choice of the accelerometers can be a primary source of vibration data for post processing and statistical analysis, in accordance with this example. In addition, the contact microphone exhibit consistently noisy signals, resulting in random false positive impact information. The wireless protocol of the accelerometers include a signal storage capability at the sensor level and a feature for automatic transmission repetition of data packets in the event of a lost connection.

Using the target resolution simulation, the spatial coverage, which is defined as the percentage ratio between the camera surveillance area and the area of the blade rotor plane, as well as the target pixel resolution, is estimated using the turbine at the NREL-NWTC as reference (rotor diameter of 40 m and nacelle length of 9 m). As an illustration, the camera is positioned at the rear end of the nacelle looking forward toward the rotor at an angle of 55° upward from the horizontal plane.

Figure 7:
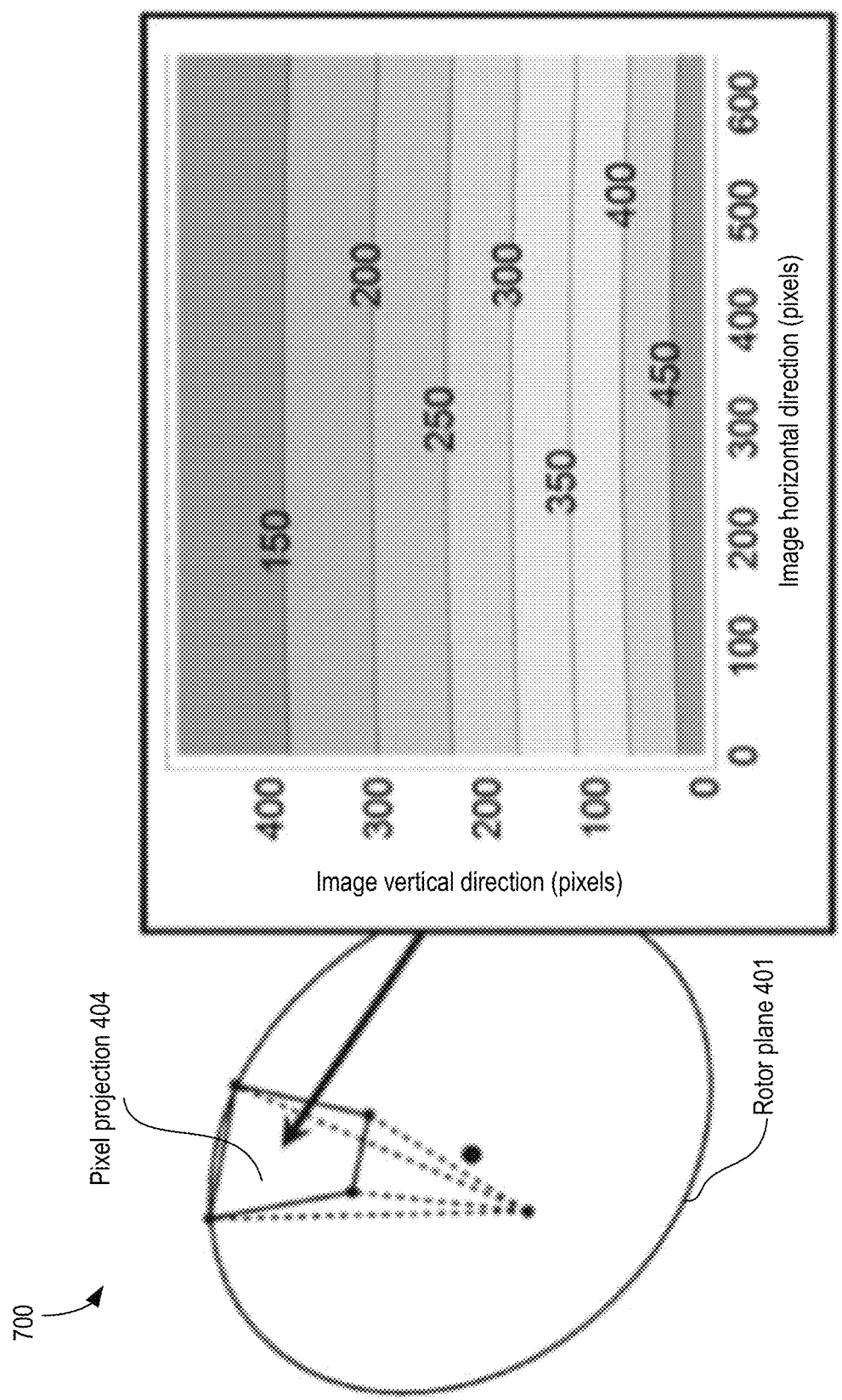
FIG. 7 illustrates a contour plot of target resolution for single camera deployed on the nacelle, in accordance with some embodiments.

FIG. 7 illustrates contour plot 700 of target resolution for single camera deployed on the nacelle, in accordance with some embodiments. Table 1 illustrates computational results of spatial coverage and target resolution for different camera configurations.

TABLE 1

| Camera Location | Spatial Coverage | Minimum Target resolution (e.g., 240 × 240 mm target) |
| --- | --- | --- |
| On the nacelle | Approximately 7% | More than 100 pixels |
| Near the tower base | Approximately 50% | More than 50 pixels |
| On an adjacent tower | Approximately 90% | Less than 20 pixels |

For an image resolution of 640×480 pixels and a focal length of 12 mm, FIG. 7 shows contour plot 700 of pixel density for a target with dimensions of 240×240 mm on rotor plane 401, assuming the target is struck by blade 103. In this configuration, the camera provides a spatial coverage of 6.5% and minimum target resolution of more than 100 pixels. Three different camera positions, at the end of nacelle 102, at the tower base, and on an adjacent tower at a distance of 200 m from turbine 100, are evaluated using the same simulation model. Results, which are summarized in Table 1, illustrate spatial coverage and target resolution for a standard 240×240 mm object. As expected, the relation is an inverse between camera coverage and image pixel resolution. The configuration on an adjacent tower provides more than 90% coverage at the expense of target resolution to a mere 20 pixels. The camera placed at the tower base offers up to 50% of coverage with a medium pixel density of 50. The negative characteristic of the above positions is the inability of the camera to follow the yawing of the nacelle, an impractical solution.

Validation of the blade sensor-triggering capabilities is also characterized. Simulations of blade collision events using tennis balls are conducted along different sections of the rotating blades during field-testing. An example of a blade striking a tennis ball is also illustrated in FIG. 8, showing the signal from the accelerometer mounted on the blade.

Figure 8:
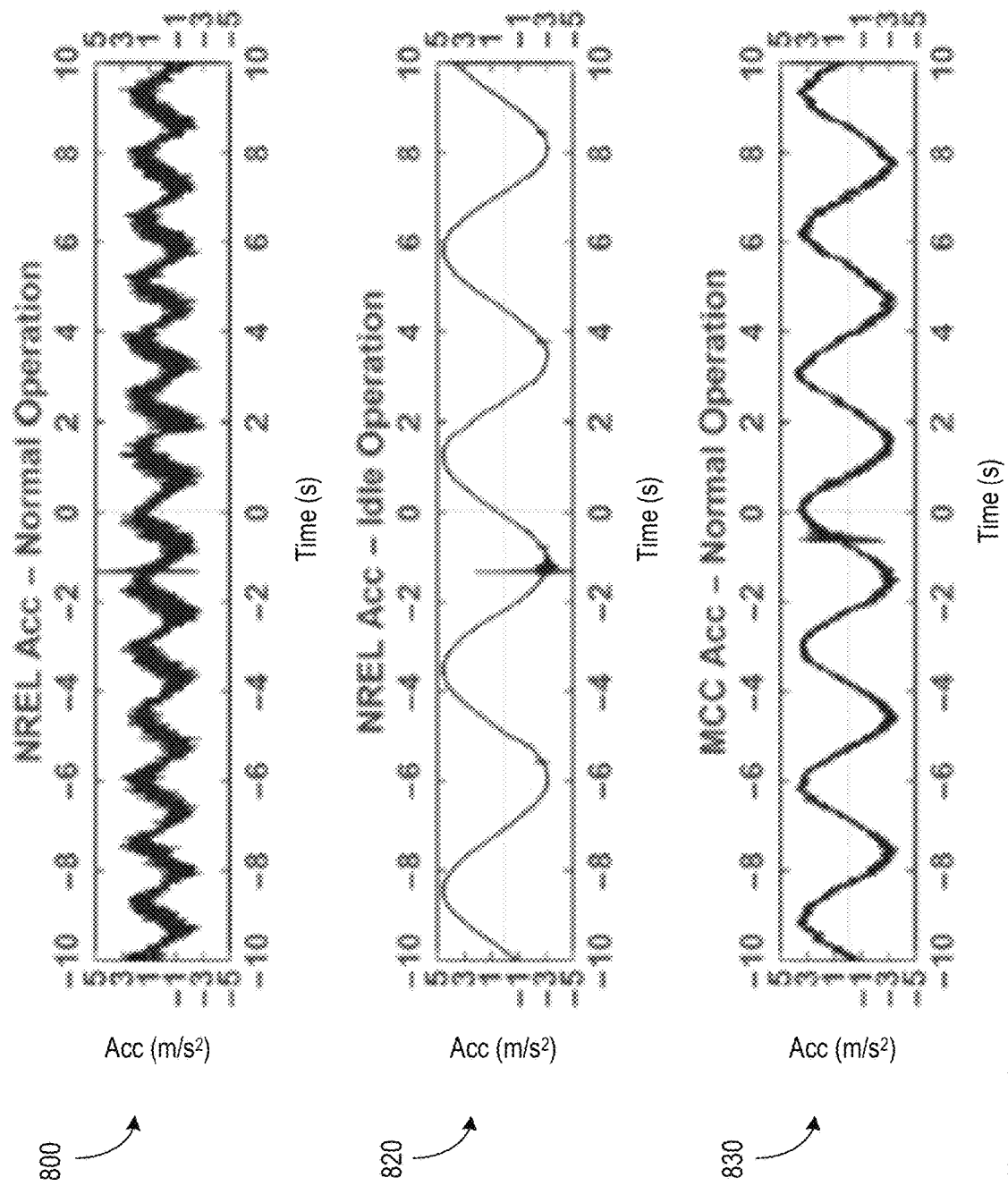
FIG. 8 illustrates accelerometer data from the CART3 600-kW turbine during normal operation and idle operation, and the GE 1.5-MW turbine during normal operation from top to bottom, in accordance with some embodiments.

FIG. 8 illustrates accelerometer data from the CART3 600-kW turbine during normal operation (plot 800) and idle operation (plot 820), and the GE 1.5-MW turbine during normal operation (plot 830) from top to bottom. The 3-time histories from top to bottom are (1) NREL CART3 during normal operations (plot 800) producing energy, (2) NREL CART3 during idle (plot 820) with generator disengaged; and (3) NAWRTC GE during normal operations (plot 830) producing energy.

Table 2 lists the results of average SNR (signal-to-noise ratio) and the corresponding percentage of coefficient of variation (CV) for each testing case. In all three plots in FIG. 8, the noise in the signals correspond to the vibrations on the root of the blade, measured by the accelerometer. Impacts are measured and can be seen on the plots at −1.33, −1.30, and −0.6 seconds, respectively.

TABLE 2

| Cases | Number of Impacts | Average SNR, dB | CV % |
|---|---|---|---|
| CART3 600-kW normal operation | 6 | 5.45 | 35.74 |
| CART3 600-kW idle operation | 4 | 14.59 | 37.01 |
| GE 1.5-MW normal operation | 23 | 7.03 | 33.05 |

The spikes of impact are slightly ahead of the triggering events due to the reaction time of the recorder. As expected, idle operations, shown in plot 820 in FIG. 8, are characterized by a lower background vibration noise, which results in the highest SNR due to the disengagement of the generator and low-power operation of the gearbox, in accordance with some embodiments.

In addition, FIG. 8 and Table 2 reveal the generally lower background vibrations on the GE turbine with respect to the NREL CART3; this condition of higher SNR may improve the efficiency of data post processing. The problem of automatically detecting a blade impact in the presence of noise at various, but predictable, frequencies is solved by applying time-frequency analysis techniques, a procedure in analyzing vibrations from rotating machines. The short-time Fourier Transform (FT) is applied to the accelerometer signals in second-stage data post processing. The primary result of this method, a spectrogram, is illustrated in FIG. 9.

Figure 9:
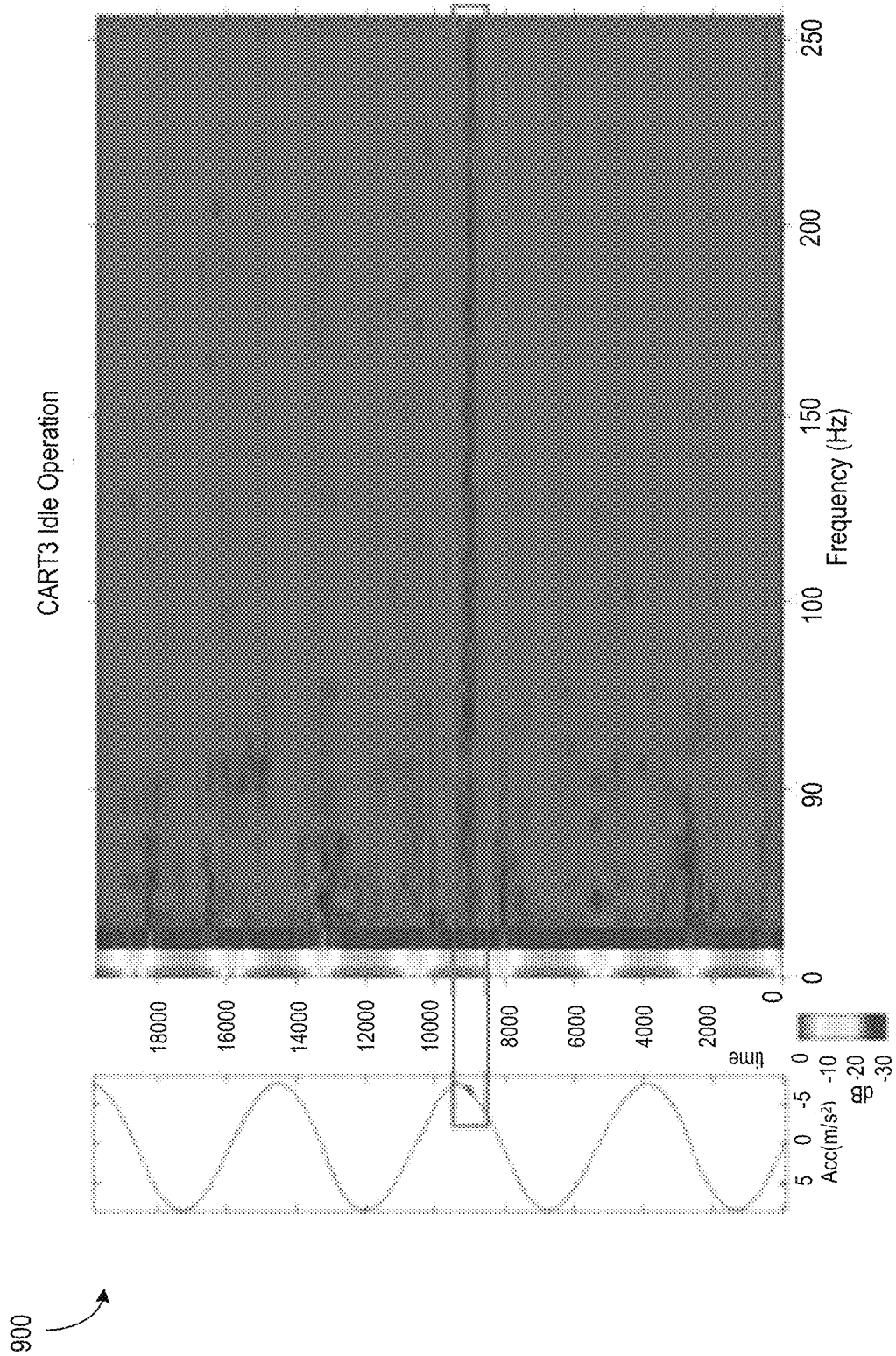
FIG. 9 illustrates acquired vibration data post processing using short-time Fourier transform, in accordance with some embodiments.

FIG. 9 illustrates plot 900 showing acquired vibration data post processing using short-time Fourier transform, in accordance with some embodiments. The plot on the left shows the time history signal of the accelerometer installed on a blade of the CART3 turbine during idle operation. An impact is identified by its corresponding spectrogram, which exhibits a spike in the frequency domain. The spectrogram provides a visual representation of the frequency spectrum in the time window selected for post processing. The technique is chosen for the potential application to detect impacts in real time. The example given in FIG. 9 is the spectrogram obtained from the signal of the accelerometer installed on a blade of the NREL CART3 turbine during idle operation with the blade hitting a tennis ball. The time history of the same event is illustrated on the left of FIG. 9; it shows the acquired signals from the accelerometer with time on the vertical axis. The spectrogram exhibits a spike in the frequency domain at the time of the blade hitting the tennis ball, thus unequivocally identifying the strike. Frequency levels at different times represent typical turbine background vibrations due to blade aerodynamics, structural vibrations, bearings, gearbox, and various mechanical sources.

General results from 29 field tests with blade strikes show the positive detection and confirmation of 14 events. The most probable cause of partial impact detection is the low-energy aspect of several events, with the result of a significantly low sensor SNR that cannot be detected with the current post processing technique. In this example, most of the detected strikes occur at the leading edge of the blade and in a radial position between half blade and blade tip, thus at relatively high kinetic energy. Impacts during turbine idle operations are particularly favorable for detection due to the extremely low background noise measured by the sensors. In some embodiments, any of the sensors is capable of detecting a strike of a blade to a tennis ball. As such, in some embodiments, not all blades of a rotor need to be provided with sensors to detect impacts.

Figure 10:
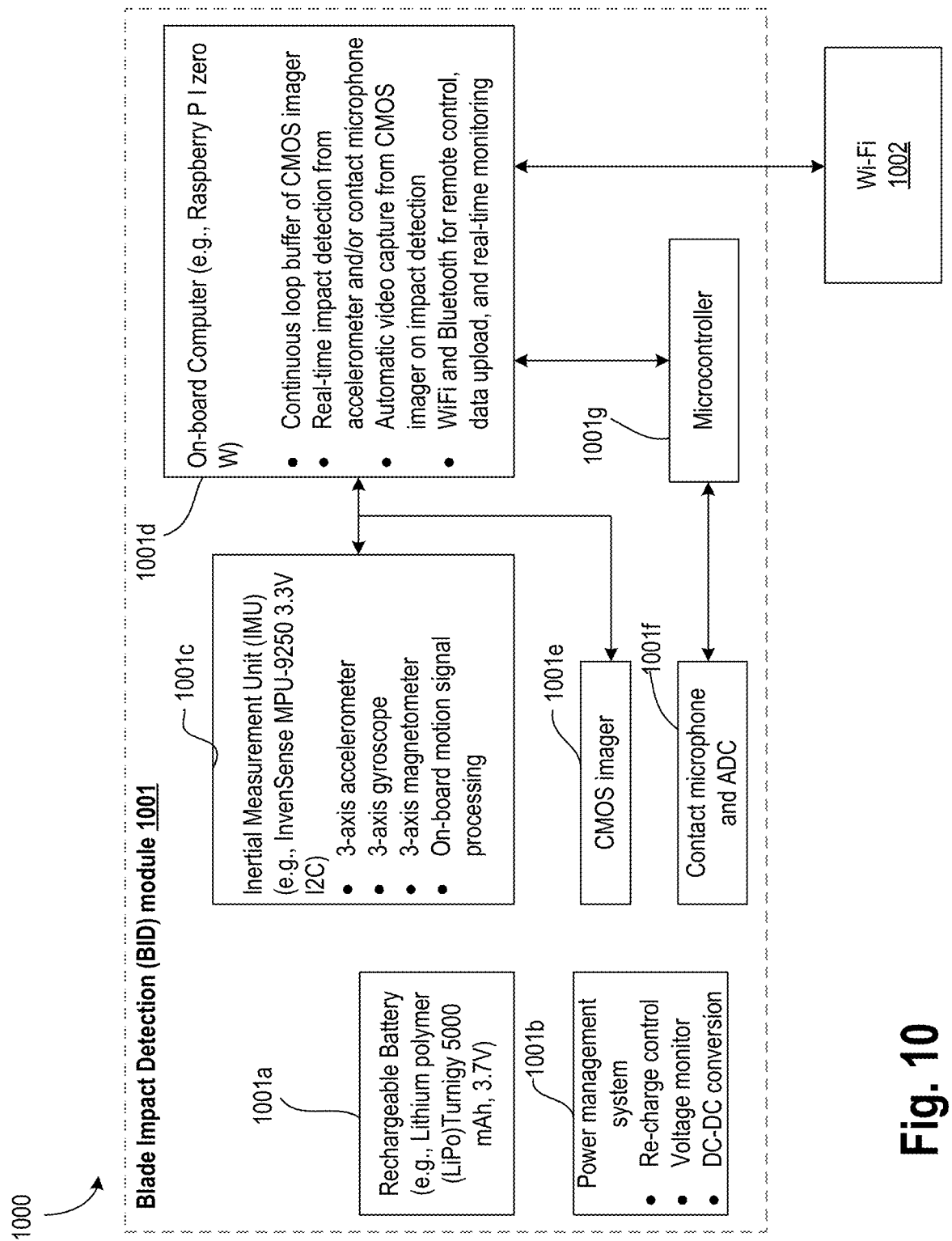
FIG. 10 illustrates a summary block diagram of on-blade impact detection (BID) module including multiple vibration sensors, camera, local computation and signal processing, nonvolatile memory, and wireless connection.

FIG. 10 illustrates block diagram 1000 of on-blade impact detection (BID) module 1001 including multiple vibration sensors, camera, local computation and signal processing, nonvolatile memory, and wireless connection. BID 1001 comprises rechargeable battery 1001a, power management system 1001b, inertial measurement unit (IMU) 1001c, on-board computer 1001d, imager 1001e, contact microphone and ADC 1001, and microcontroller 1001g. BID module 1001 is communicatively coupled to a connectivity interface 1002. In some embodiments, connectivity interface 1002 includes:

Connectivity interface 1002 represents hardware devices and software components for communicating with other devices. Connectivity interface 1002 may support various connectivity circuitries and standards. For example, connectivity interface 1002 may support GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. In some embodiments, connectivity 1002 may support non-cellular standards such as WiFi.

In some embodiments, blade impact detection (BID) module 1001 is provided to continuously monitor mechanical vibration signals propagating through a wind turbine blade to identify objects impacting the blade in real-time. BID module 1001 includes vibration sensors, camera, wireless connection, memory, and localized computation. In some embodiments, BID module 1001 is mounted near the root of each turbine blade 103, oriented such that the camera is pointed down the length of the blade to capture as much of the blade surface as possible in its field of view. The modules can be powered from the turbine, or using battery power or could be powered through solar panels or energy harvesting from the turbine rotor motion. Continuous vibration signals, detected impacts, and captured images are all stored locally on the module and are also available via a wireless connection e.g., WiFi currently, Bluetooth Low Energy (BLE) possible.

BID module 1001 includes hardware and software. The hardware components of BID module 1001 include IMU 1001c. In some embodiments, vibration sensing is accomplished using multiple sensors of IMU 1001c. These sensors include a 3-axis accelerometer, a piezoelectric contact microphone, 3-axis gyroscope, 3-axis magnetometer, on-board motion signal processing integrated circuit, etc. Another hardware component is camera 1001e such as a CMOS (complementary metal oxide semiconductor) camera can take video or still images. Camera 1001e has an adjustable lens to set the focal distance (typically at infinite focus for maximum depth of field). An on-board computer module 1001d (e.g., Raspberry Pi Zero W) provides data acquisition, signal processing, nonvolatile storage, and wireless control and data access using connectivity interface 1002. In some embodiments, on-board computer module 1001d includes continuous loop buffer of imager 1001e, logic for real time impact detection from accelerometer and/or contact microphone, logic for automatic video capture from imager 1001e or impact detection circuitry, and communication interface (e.g., Wi-Fi, Bluetooth, cellular, etc.) for remote control data uploading and for real-time monitoring.

In some embodiments, BID module 1001 operates from battery power or using available wired power on the wind turbine. In one such case, a rechargeable battery 1001a is provided that can be recharged by the energy generated by turbine 100. Any suitable rechargeable battery technology may be used. For example, Lithium Ion battery is used for recharging battery 1001a.

In some embodiments, BID module 1001 includes power management system 1001b which provides the necessary power to all the logic, circuits, and chips of BID module 1001. For example, power management system 1001b includes logic to control frequency of charging/re-charging of battery 1001a, logic or circuit to monitor power supply, and DC-DC converter to generate a regulated power supply for the logic, circuits, and chips.

In various embodiments, microcontroller 1001g is part of on-board computer 1001d or separate integrated chip. In some embodiments, microcontroller 1001g is a Digital Signal Processor (DSP), an Application Specific Integrated Circuit (ASIC), a general purpose Central Processing Unit (CPU), or a low power logic implementing a finite state machine to perform the detection of objects hitting the blade and analysis of the vibration.

The complete BID module 1001 has sufficiently small size and mass to be mounted on the root of a wind turbine blade using double-sided adhesive tape, for example. The BID module 1001 communicates with central control computer 105 wirelessly. In some embodiments, central control 105 is located in nacelle 102 or on the ground, depending on wireless connection strength. For example, central control 105 is in a cloud where data is gathered and processed, and this cloud is accessible from any terminal. In some embodiments, multiple BID modules 1001 can communicate with the same central computer, such that a module is mounted on each turbine blade.

BID module 1001 also includes software components. During normal impact detection and imaging operation, imager 1001e is operated as a video camera (e.g., 30-90 frames per second (fps)), and a continuous video loop is buffered in volatile memory in on-board computer 1001d. The loop/buffer size is adjustable, and this is typically about, for example, 1-10 seconds. A continuous buffer is used, as impact detection occurs at or after impact, and the buffer provides image frames both before and after this impact detection time.

Figure 11:
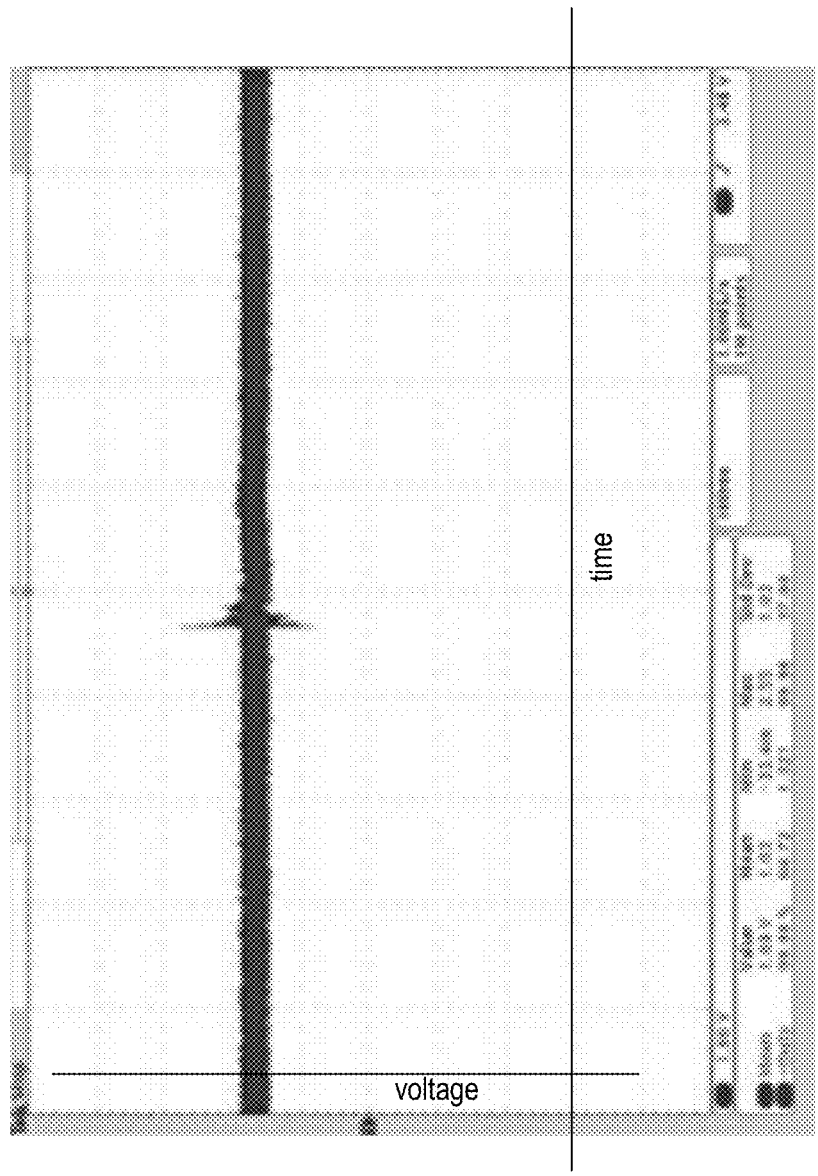
FIG. 11 illustrates a plot showing raw contact microphone data recorded from the front-end amplifier integrated into the impact detection module, including typical measured impact event using test rig, in accordance with some embodiments.
Figure 12:
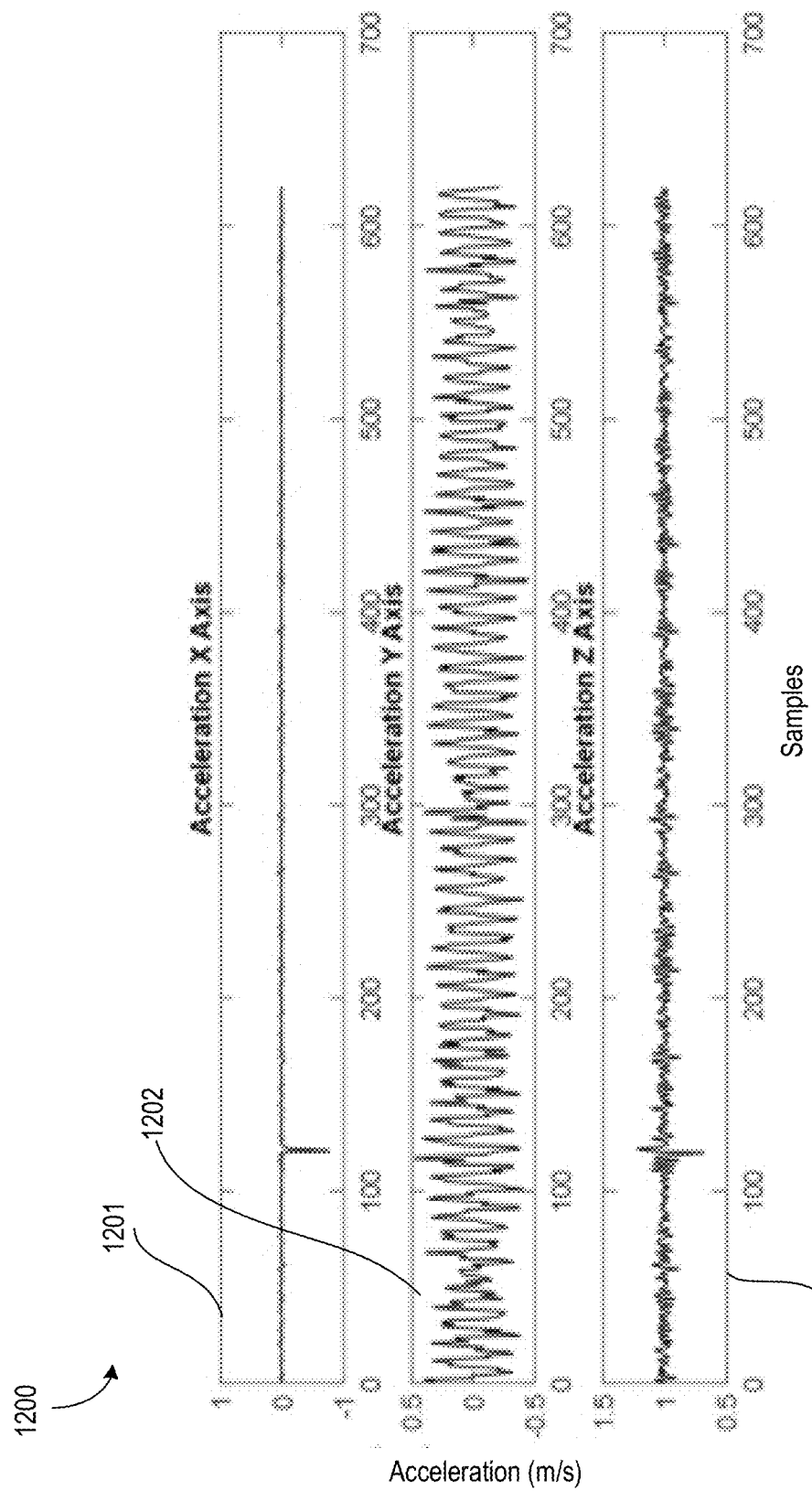
FIG. 12 illustrates a plot showing raw 3-axis accelerometer data recorded by the impact detection module using the test rig, in accordance with some embodiments.

FIG. 11 illustrates plot 1100 showing raw contact microphone data recorded from the front-end amplifier integrated into the impact detection module, including typical measured impact event using test rig. FIG. 12 illustrates plot 1200 showing raw 3-axis accelerometer data recorded by the impact detection module using the test rig.

Vibration signals (examples in FIG. 11 and FIG. 12) are processed in real-time using on-board computer 1001d, which runs an impact detection algorithm on one or more vibration signals with an adjustable threshold. Plot 1200 shows three sub-plots 1201, 1202, and 1203. Plot 1201 is acceleration data along x-axis. Plot 1202 is acceleration data along y-axis. Plot 1203 is acceleration data along the z-axis. Data shown in FIG. 12 is recorded in the presence of induced mechanical vibrations from the shaker, and an impact from the glass test bead is visible in two axes—plots 1201 and 1203.

When an impact is detected, the current video buffer is stored to nonvolatile memory, with the impact located nominally in the middle of the set of buffered image frames.

Figure 13:
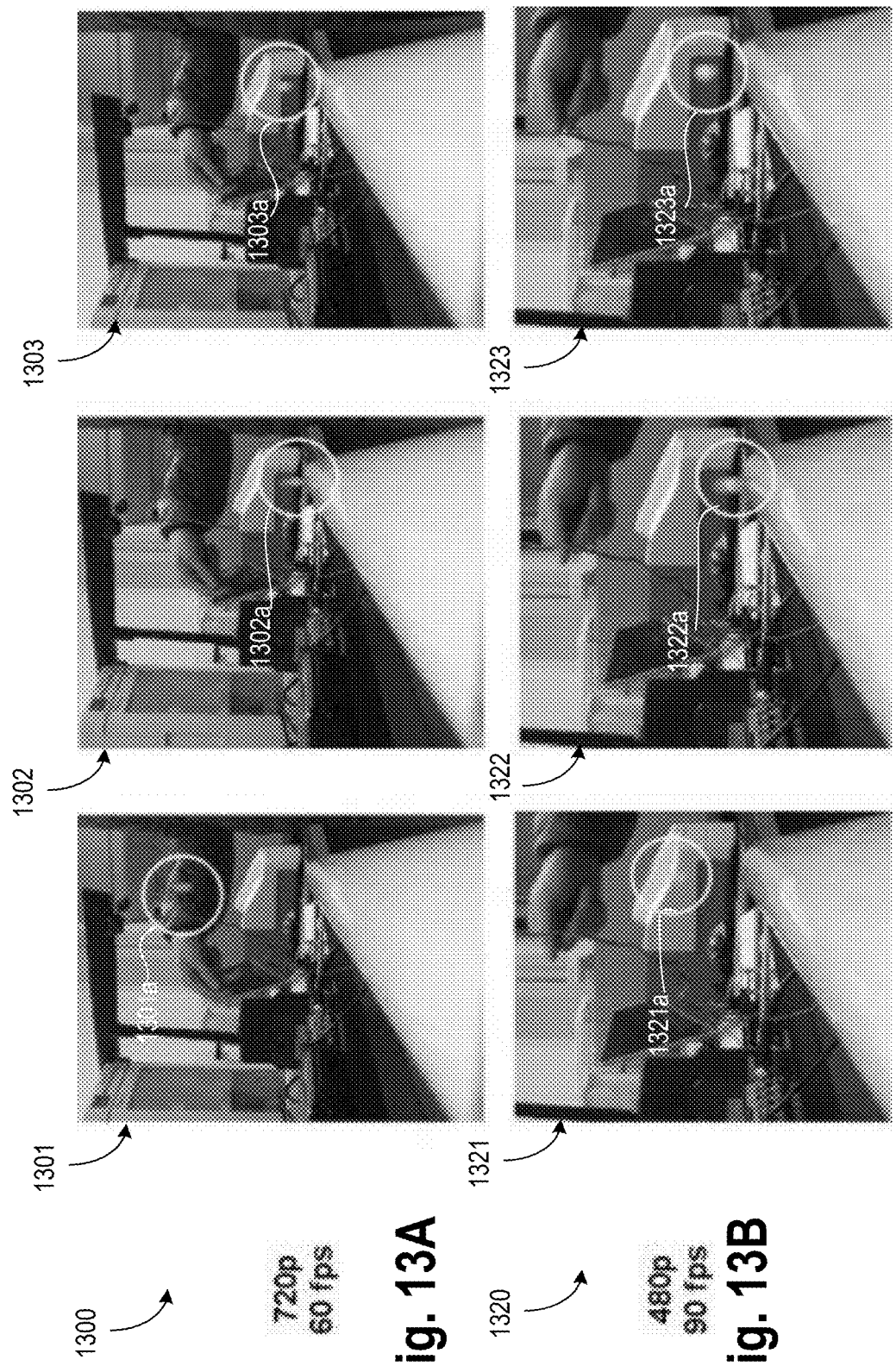
FIGS. 13A-B illustrate still image frames taken from video files captured automatically during an impact detection event; these frames detail the time before, during, and after impact.

FIGS. 13A-B illustrate still image frames 1300 and 1320, respectively, taken from video files captured automatically during an impact detection event; these frames detail the time before, during, and after impact. FIG. 13A uses a slower camera with more pixels per image than the one used for FIG. 13B. For example, the camera of FIG. 13A uses 60 fps speed with 720 pixels per image while FIG. 13B uses 90 fps speed with 480 pixels per image. The image frames 1301, 1302, 1303, 1321, 1322, and 1323 are automatically captured by camera 1001e. The camera captures the object at various points in different image frames. Using the camera parameters of FIG. 13A, the object is captured at locations 1301a, 1302a, and 1303a in frames 1301, 1302, and 1303, respectively. Using the camera parameters of FIG. 13B, the object is captured at locations 1321a, 1322a, and 1323a in frames 1321, 1322, and 1323, respectively.

Figure 14:
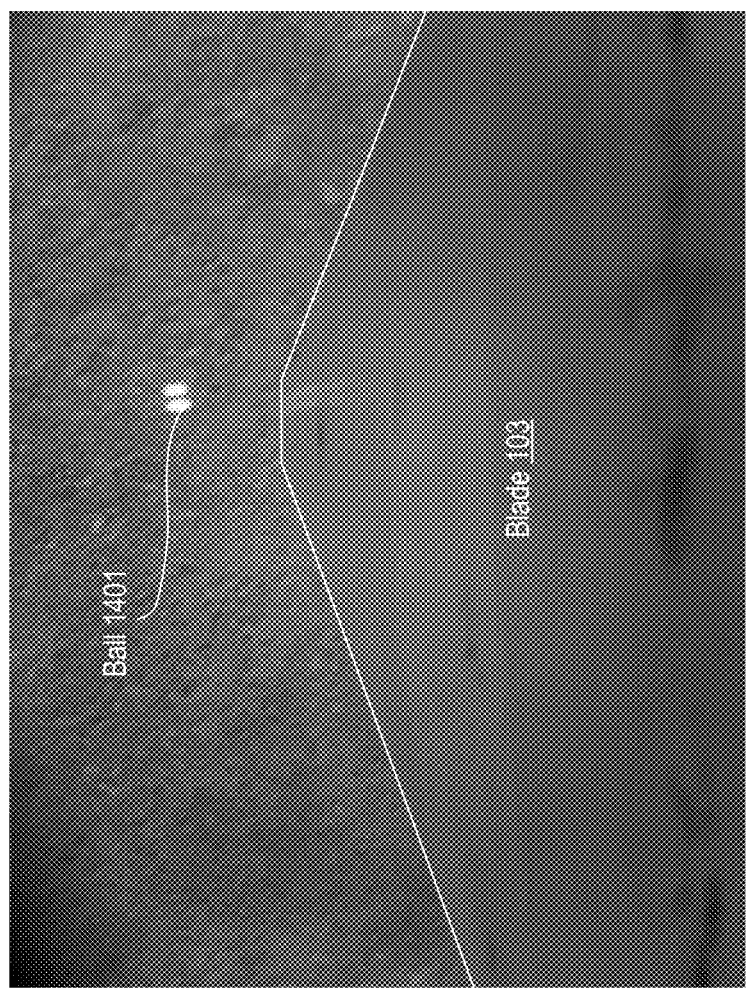
FIG. 14 illustrates a still image of two tennis balls near a turbine blade taken from a blade-mounted BID module automatically following a detected impact.

FIG. 14 illustrates still image 1400 of two tennis balls 1401 near a turbine blade 103 taken from a blade-mounted BID module 1001 automatically following a detected impact. Turbine blade 103 is in a downward position at the time of a detected impact, and the ground is visible past the turbine blade.

Recorded data is available via a wireless connection to BID module 1001. BID module 1001 can also send an alert when an impact is detected. Recorded data includes captured images, multi-sensor vibration data, and 3-axis gyro-meter data; the latter is used to establish turbine blade position at the time of impact.

Figure 15:
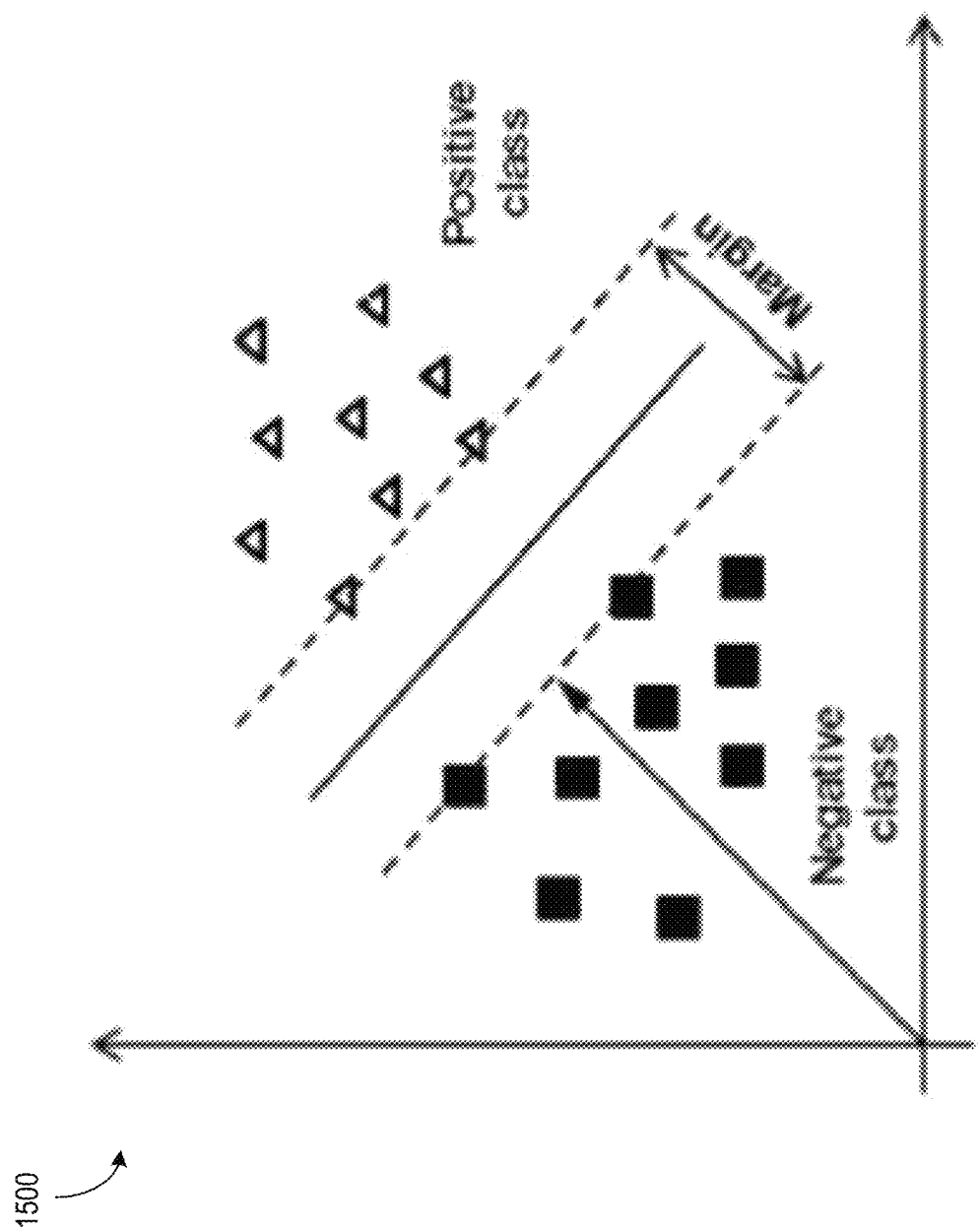
FIG. 15 illustrates linear classifier in 2D space, in accordance with some embodiments.

FIG. 15 Illustrates linear classifier 1500 in 2D (two-dimensional) space, in accordance with some embodiments. In various embodiments, machine-learning is applied to impact detection of wind turbine blades. The significant development of wind power generation worldwide brings, together with environmental benefits, wildlife concerns for volant species vulnerable to interactions with wind energy facilities. For surveying such events, an automatic system for continuous monitoring of blade collisions is provided. An onboard multi-sensor system capable of providing real-time collision detection using integrated vibration sensors is developed. In various embodiments, an advanced impact detection scheme is deployed which is described here.

After a preliminary signal pre-processing, geometric features specifically selected for their sensitivity to impact signals are extracted from raw vibration signal and energy distribution graph. The predictive model is formulated by training conventional support vector machine using extracted features for impact identification. The performance of the predictive model is then evaluated by accuracy, precision and recall. Results indicate a linear regression relationship between signal-to-noise ratio (SNR) and model overall performance. The method of some embodiments is much reliable on higher signal-to-noise ratio (e.g., SNR≥6), for example.

In some embodiments, support vector machine (SVM) is used for general classification problems such as condition monitoring and fault diagnosis. Relevant features of an event are extracted and then represented as a vector in SVM feature space. Non-probabilistic binary linear classifiers allow SVM to divide the feature space into different categories, enabling automatic prediction of a future event on its member category.

Some embodiments describe a robust signal processing method based on SVM applied to automated impact detection. First, geometric features associated with structure characteristics of impact signals are extracted from both raw vibration signals and energy distribution graph. Second, input vectors constructed by extracted features are applied to train the SVM model, which is used for impact identification after training. Signal qualities of common vibration sensors on non-stationary wind turbine blades are illustrated to evaluate the feasibility of automated impact detection method using conventional support vector machine, especially for different levels of SNR. SVM is a supervised machine-learning method, which is used in machine condition monitoring and fault diagnosis. The process of SVM for a binary classification problem is described as follows.

Assume a sample dataset $(x_i, y_i)^N$ where the notation $x_i$ denotes the $i^{th}$ vector in the dataset and $y_i$ is the label associated with $x_i$. In binary classification, the positive and negative classes are labeled with $y_i=1$ and $y_i=-1$, respectively. The discriminant function is of the form:

$$f(x)=w^T x+b, \quad (2)$$

where w is the weight vector, and b is the bias. Based on the discriminant function, a hyperplane is defined by:

$$f(x)=w^T x+b=0 \quad (3)$$

divides the input space X into two classes: positive (f(x)>0) and negative (f(x)<0). To find the optimal hyperplane, the maximum margin criterion is applied, by which the optimal hyperplane is the hyperplane that gives the maximum distance between the decision boundary and the plane, as illustrated in FIG. 15.

Considering noisy data that are not linearly separable, or to achieve a larger margin, misclassification is allowed by introducing slack variables $\xi_i>0$ and error penalty C>0. The problem can be expressed by the following constrained optimization problem:

$$\text{Minimize } \tfrac{1}{2}\|w\|^2+C\Sigma_{i=1}^n \varepsilon_i \quad (4)$$

$$\text{subject to } y_i(w^T x_i+b) \geq 1-\varepsilon_i \quad (5)$$

which is also known as soft-margin SVM.

Introducing lagrange multipliers $\alpha_i$, this optimization problem can be converted into the equivalent Lagrange dual formulation:

$$\text{Minimize } L(\alpha)=\Sigma_{i=1}^N \alpha_i - \tfrac{1}{2}\Sigma_{i=1}^N \alpha_i \alpha_j y_i y_j x_i^T x_j \quad (6)$$

$$\text{Subject to } \Sigma_{i=1}^N x_i y_i = 0, \ 0 \leq \alpha_i \leq C \quad (7)$$

To define a nonlinear classifier, the input vector $x_i$ is mapped from lower input space X into higher feature space F by mapping function $\phi(x)$, which typically calculates using a dot product. However, the approach of explicitly mapping each input vector from the input space into the feature space results in quadratic complexity (i.e., quadratic increase in memory usage and quadratic increase in time required for computation). The kernel function $K(x_i, x_j)=\phi^T(x_i)\cdot\phi(x_j)$ is then introduced to solve the issue by skipping the step of explicitly mapping. The following four basic kernels are used:

$$\text{Linear: } K(x_i,x_j)=x_i^T x_j \quad (8)$$

$$\text{polynomial: } K(x_i,x_j)=(\gamma x_i^T x_j+r)^d, \gamma>0 \quad (9)$$

$$\text{radial basis function (RBF): } K(x_i,x_j)=\exp(-\gamma\|x_i-x_j\|^2), \gamma>0 \quad (10)$$

$$\text{sigmoid: } K(x_i,x_j)=\tan h(\gamma x_i^T x_j+r) \quad (11)$$

Here, the RBF kernel is applied. However, other kernels can also be applied. The problem is then converted into a "kernelized" dual quadratic optimization problem as follows:

$$\text{Minimize } L(\alpha)=\Sigma_{i=1}^N \alpha_i - \tfrac{1}{2}\Sigma_{i=1}^N \alpha_i \alpha_j y_i y_j K(x_i,x_j) \quad (12)$$

$$\text{Subject to } \Sigma_{i=1}^N x_i y_i=0, \ 0 \leq \alpha_i \leq C \quad (13)$$

This problem can be solved by the method of sequential minimal optimization. The discriminate function is then expresses as:

$$f(x)=\text{sign}(\Sigma_{i=1}^N \alpha_i y_i K(x_i,x_j)+b) \quad (14)$$

Figure 16A:
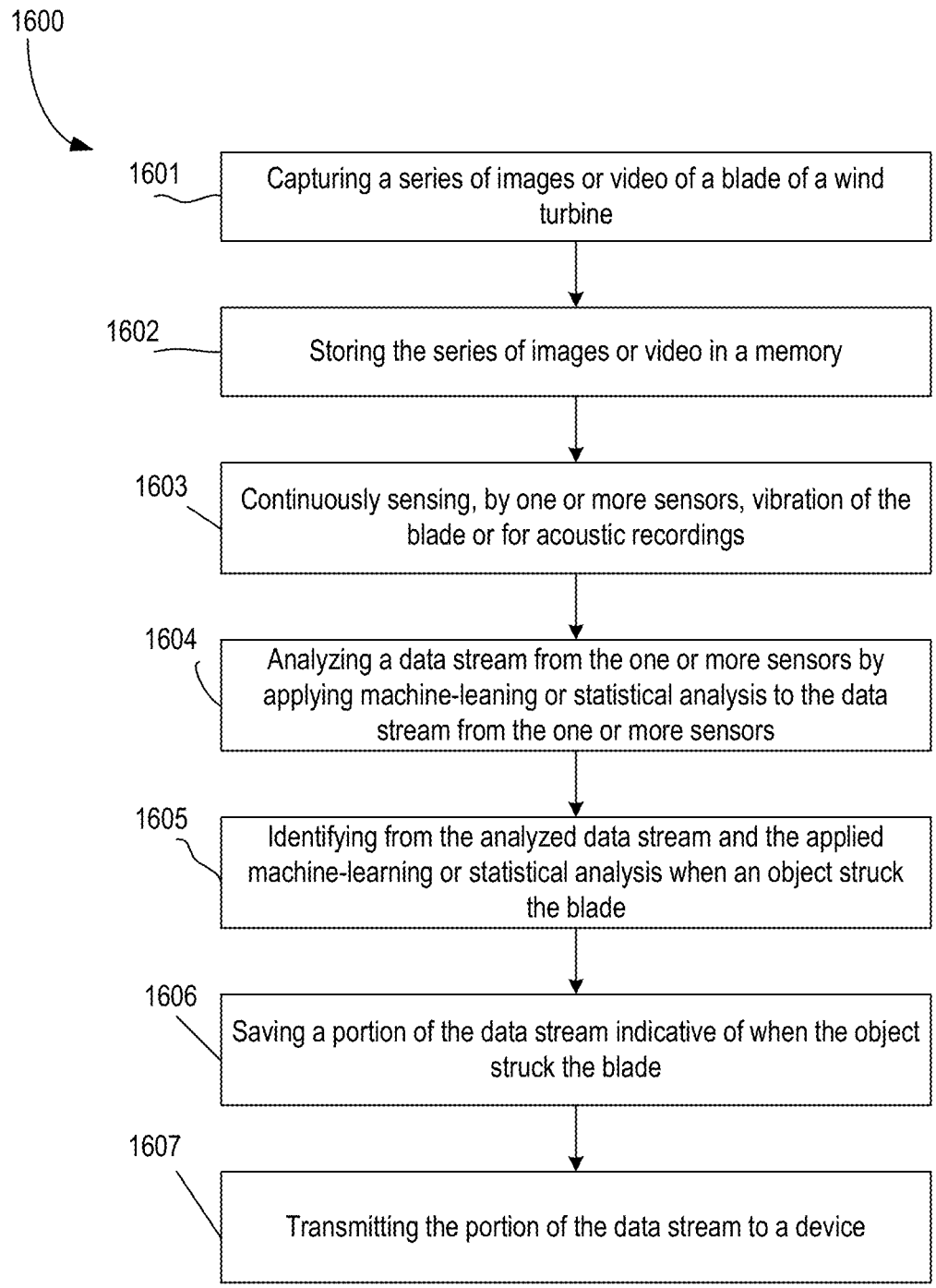
FIG. 16A illustrates a high-level flowchart of procedure for impact detection, in accordance with some embodiments.
Figure 16B:
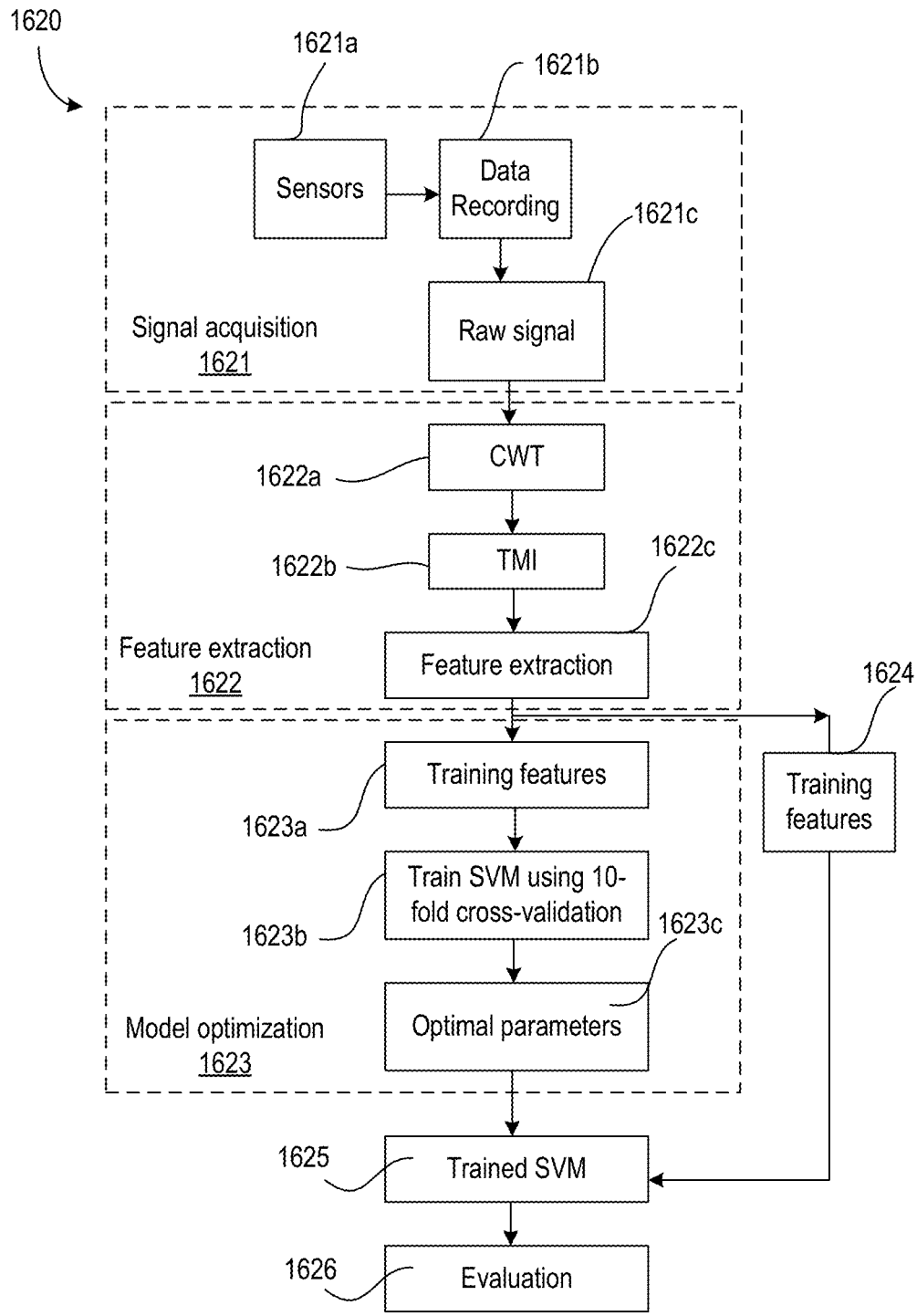
FIG. 16B illustrates a flowchart of procedure for impact detection, in accordance with some embodiments.

Here, SVM is used as the classification method, and a procedure for the automatic impact detection using SVM is shown in FIG. 16B.

FIG. 16A illustrates a high-level flowchart 1600 of procedure for impact detection, in accordance with some embodiments. While the blocks are disclosed in a specific order, the order can be modified. For example, some operations can be performed before others and some can be performed in parallel or simultaneously. At block 1601, a first circuitry captures a series of images or video of blade 103 of wind turbine 100. The first circuitry may include a visual camera, or an infrared camera. These cameras can be part of the optical node 104 or installed on blade 103 of wind turbine 100. For example, the cameras may be part of vibration node 108. First circuitry may also be part of central control 105.

At block 1602, the first circuitry stores the captured series of images or video in a memory space. This memory space is a volatile memory space and is reused. At block 1603, first circuitry or any other circuitry continuously senses vibration of blade 103 or for acoustic recordings. For example, acoustic node 106 and/or vibration node 108 look for uncommon sounds (e.g., attributed to birds or a collision of an object o blade 103). The sensed data is also stored in the memory space.

At block 1604, a second circuitry (e.g., central control 105, a processor in the cloud, part of BID module 1001) analyzes a data stream from the one or more sensors by applying machine-learning or statistical analysis to analyze the one or more sensors. In some embodiments, machine-learning or statistical analysis is applied to the data stream to control sensitivity of the one or more sensors. More details about such machine-learning are explained with reference to FIG. 15 and FIG. 16B. Referring back to FIG. 16A, at block 1605, the results of machine-learning and the analyzed data stream are reviewed for indications of when an object of any type struck blade 103. By knowing the time period associated with when the object struck blade 103, at block 1606, a portion of the data stream from the memory space is identified and saved. This portion of the data stream is indicative of when the object struck the blade. In some embodiments, the rest of the data stream is discarded or deleted to free up memory space. At block 1607, the portion of the data stream is transmitted to another device (e.g., cloud) for further analysis. The further analysis may include feature extraction for machine-learning optimization. For example, weights associated with classification of features to identify objects sticking blade 103 are refined or adjusted so the model used by machine-learning can quickly determine with high confident if an object hit and/or the kind of object that struck.

FIG. 16B illustrates flowchart 1620 of procedure for impact detection, in accordance with some embodiments. While the blocks are disclosed in a specific order, the order can be modified. For example, some operations can be performed before others and some can be performed in parallel or simultaneously.

At block 1621, signal acquisition is performed. In this block, data 1621*a* from vibration sensors 108 (and other sensors 106, 104) is gathered including recording of data 1621*b* indicating an object interaction with blade 103. This data is used to generate the raw vibration signal 1621*c*. Blade vibrations are selected as the primary triggering source of the system. Wireless three-axis accelerometers (e.g., LORD MicroStrain G-Link LXRS w/ 104-LXRS base station) are installed at the root of each blade with weatherproof housing, as shown in FIGS. 2-3.

The installation position for the sensors is selected for easier accessible installation and maintenance, and negligible aerodynamic effects on the blades. For timely processing of data for real-time collision monitoring, considering the processing capabilities of the selected hardware, sampling rates are chosen at 512 Hz.

At block 1622, features are extracted from the raw vibration signal 1621*c*. At block 1622*a*, the raw signal is pre-processed using continuous wavelet transform (CWT). At block 1622*b*, a time marginal integration (TMI) graph is obtained by calculating the energy distribution in CWT with respect to time (e.g., integrating CWT with respect to time for each scale). At block 1622*c*, features are extracted from both raw signal and TMI graphs. The selected 18 features are listed in Table 1.

Table 3 illustrates the list of extracted features from the raw signal and the TMI signal.

TABLE 3

| No. | Feature | Source |
|---|---|---|
| 1 | Kurtosis | Raw signal |
| 2 | Skewness | |
| 3 | Mean | |
| 4 | RMS | |
| 5 | Variance | |
| 6 | Peak | |
| 7 | Impulse factor | |
| 8 | Shape factor | |
| 9 | Crest factor | |
| 10 | Kurtosis | TMI signal |
| 11 | Skewness | |
| 12 | Mean | |
| 13 | RMS | |
| 14 | Variance | |
| 15 | Peak | |
| 16 | Impulse factor | |
| 17 | Shape factor | |
| 18 | Crest factor | |

At block 1623, the SVM model is trained and optimized. At block 1623*a*, the features are trained. At block 1623*b*, the SVM model is trained and tested by a 10-fold cross-validation. Parameters y and C are optimized, at block 1623*c*, by grid search in a grid of $2^{-10}$-$2^{10}$. In some embodiments, the trained SVM model of block 1625 uses training features 1624 directly after the process of feature extraction 1622 and/or the optimal parameters from block 1623*c*. At block 1626, an evaluation is performed to ascertain whether the object actually hit blade 103, and to take counter measures to avoid birds and bats from approaching blade 103. The counter measures could be alarms at frequency that deter birds but are inaudible to humans.

Figure 16C:
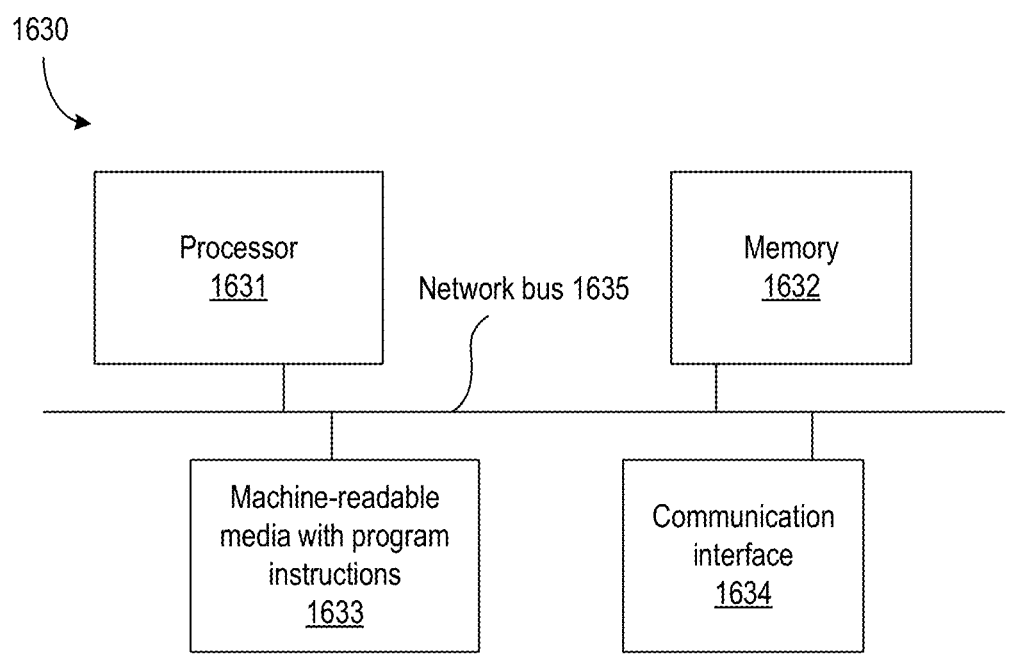
FIG. 16C illustrates a computing system (e.g., BID) to execute the process of FIGS. 16A-B, in accordance with some embodiments.

FIG. 16C illustrates computing system (e.g., BID 1001) 1630 to execute the process of FIGS. 16 A-B, in accordance with some embodiments. Various operations of flowcharts 1600 and 1620 can be performed by hardware (e.g., hardware of BID module 1001) or software (e.g., software of BID module 1001). Elements of embodiments (e.g., flowcharts and scheme described with reference to various embodiments are also provided as a machine-readable medium (e.g., memory) for storing the computer-executable instructions (e.g., instructions to implement any other processes discussed herein).

In some embodiments, computing platform 1630 comprises processor 1631, memory 1632, machine-readable storage media 1633 (also referred to as tangible machine-readable medium), communication interface 1634 (e.g., wireless or wired interface), and network bus 1635 coupled as shown.

In some embodiments, processor 1631 is a Digital Signal Processor (DSP), an Application Specific Integrated Circuit (ASIC), a general purpose Central Processing Unit (CPU), or a low power logic implementing a simple finite state machine to perform the method of the flowchart(s) and/or various embodiments, etc.

In some embodiments, the various logic blocks of the system 1620 are coupled via network bus 1635. Any suitable protocol may be used to implement network bus 1635. In some embodiments, machine-readable storage medium 1633 includes Instructions (also referred to as the program software code/instructions) for calculating or measuring distance and relative orientation of a device with reference to another device as described with reference to various embodiments and flowchart.

Program software code/instructions associated with the flowcharts (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with the one or more flowcharts (and/or various embodiments) are executed by system.

In some embodiments, the program software code/instructions associated with the flowcharts (and/or various embodiments) are stored in computer executable storage medium 1635 and executed by processor 1631. Here, computer executable storage medium 1633 is a tangible machine readable medium that can be used to store program software code/instructions and data that, when executed by a computing device, causes one or more processors (e.g., the processor) to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer-to-peer networks and the like, including the Internet. Different portions of the software program code/instructions and data can be obtained at different times and in different communication sessions or in the same communication session.

The software program code/instructions (associated with the one or more flowcharts and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine-readable medium in entirety at a particular instance of time.

Examples of tangible computer-readable media 1633 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine-readable medium 1633 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone® or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, traditional communication applications and subsidized application(s) may be used in some embodiments of the disclosed subject matter.

Figure 17:
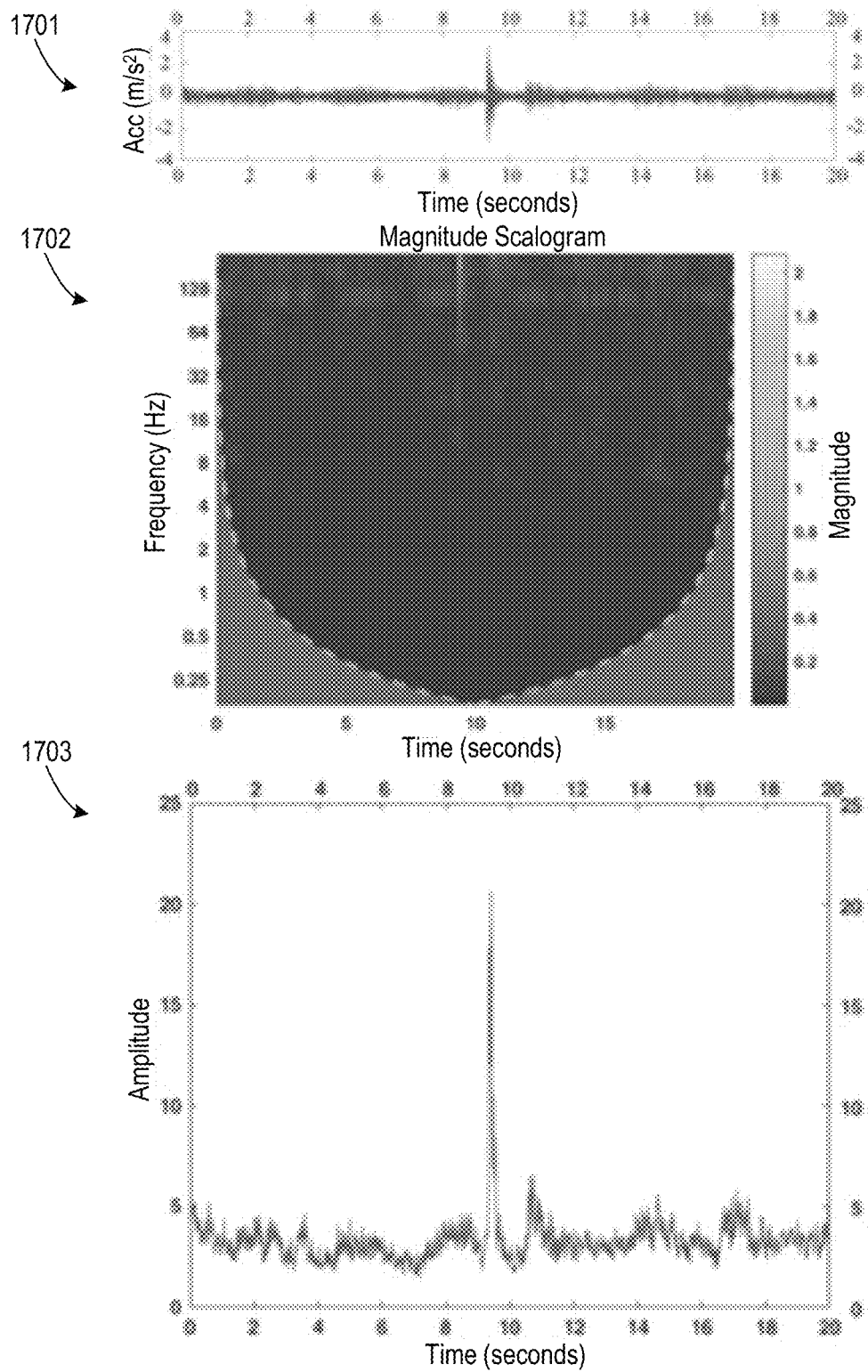
FIG. 17 illustrates a combination of three graphs showing: a) Time-series plot, b) Wavelet plot, and c) Integration of wavelet respect to frequency, respectively, for NAWRTC GE turbine during normal operation, in accordance with some embodiments.
Figure 18:
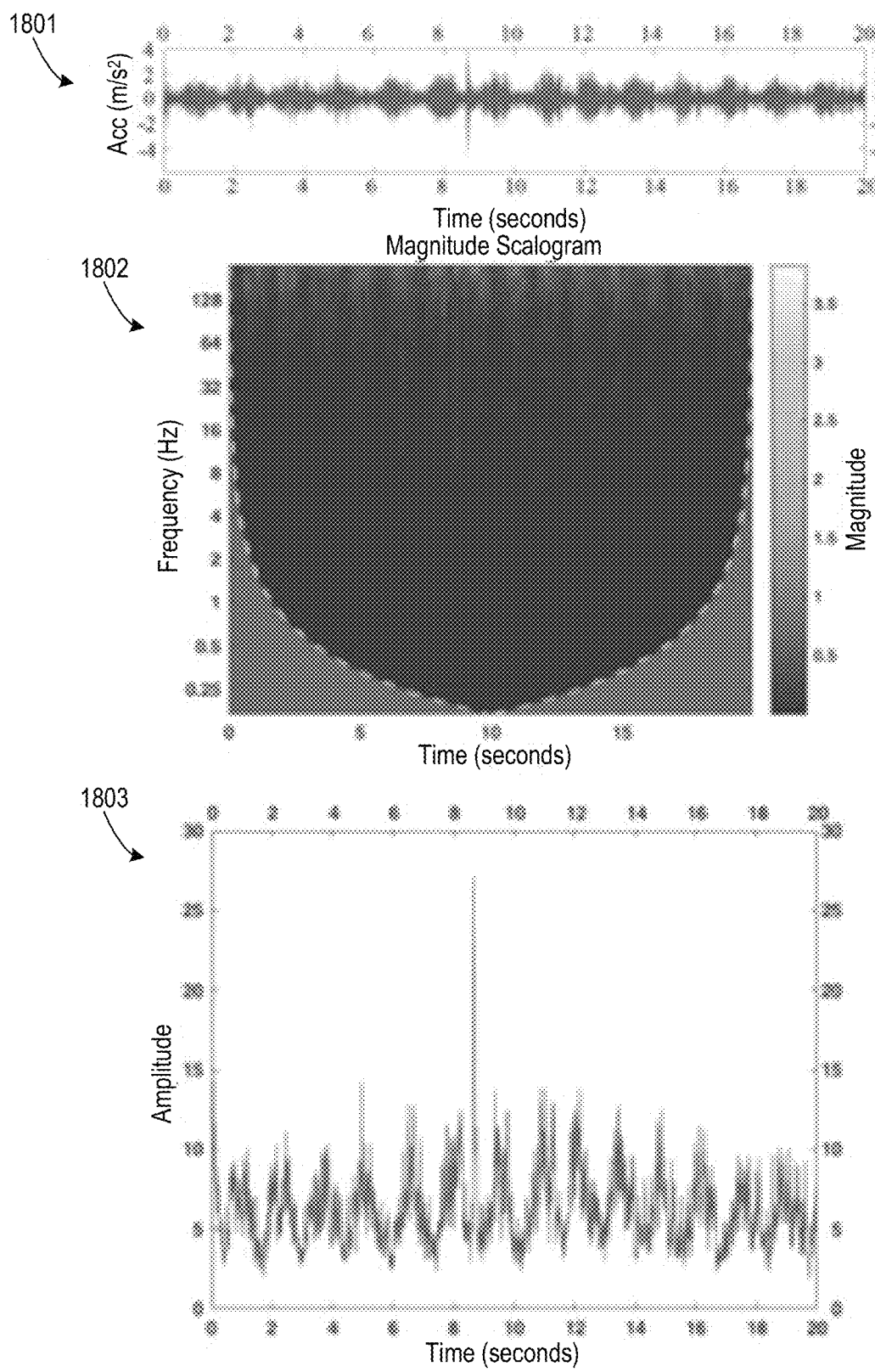
FIG. 18 illustrates a combination of three graphs showing a) Time-series plot, b) Wavelet plot and c) Integration of wavelet respect to frequency, respectively, for NREL CART3 during normal operation, in accordance with some embodiments.

FIG. 17 illustrates a combination of three graphs showing a) Time-series plot 1701, b) Wavelet plot 1702 and c) plot 1703 showing integration of wavelet respect to frequency, respectively, for NAWRTC GE turbine during normal operation. FIG. 18 illustrates a combination of three graphs showing a) Time-series plot 1801, b) Wavelet plot 1802 and c) plot 1803 showing integration of wavelet respect to frequency, respectively, for NREL CART3 during normal operation. For SVM data preparation, the raw signals are pre-processed. FIG. 17 and FIG. 18 illustrate the pre-processing steps using raw signals from both the GE and CART3 turbines under normal operation. The raw time histories of FIG. 17 and FIG. 18 are shown in FIG. 8 bottom and top, respectively.

A high-pass filter is applied to eliminate low-frequency components (e.g., f≤5 Hz) caused by blade rotation. Resultant time histories are shown in FIG. 17(*a*) and FIG. 18(*a*). This step is applied to eliminate the considerably large kinetic energy caused by blade rotation, which can easily dominate the energy distribution graph if presented. FIG. 17(*b*) and FIG. 18(*b*) show the scalograms as results of the continuous wavelet transform (CWT). CWT gives overall better time resolution for high-frequency components, which is essential for obtaining the energy distribution graph when integrating CWT with respect to time. FIG. 17(*c*) and FIG. 18(*c*) are the energy distribution plots illustrated by TMI graphs. It is noted that impacts are better distinguishable in TMI graphs than in CWT plots. Features listed in Table 2 are then extracted from the raw signal and the TMI graph to obtain a training and testing dataset.

Since bird/bat impacts are rare, artificial impacts are created by launching tennis balls using a compressed-air cannon. Ideally, the vibration sensors are installed on turbine blades for a sufficient time to obtain both signals with and without artificial impacts. However, even with artificial impacts, merely a handful of events are successfully created, as stated in the previous section. The predictive model developed by such imbalanced dataset can be biased and inaccurate, especially when the detection of the impact is crucial. Hence, mathematically simulated impact events are conducted for a sufficient number of training examples from both positive (i.e., impact events) and negative (i.e., non-impact events) categories. In the simulation, a single impact signal is defined as:

$$s(xt) = \begin{cases} 0, t < 0 \\ \exp\left(-\frac{\varepsilon}{\sqrt{1-2\varepsilon^2}} \cdot 2\pi ft\right) \sin(2\pi ft), t \geq 0 \end{cases} \quad (15)$$

where $\xi$ is the damping coefficient, $$\frac{\varepsilon}{\sqrt{1-2\varepsilon^2}}$$

is the damping attenuation characteristics of impact response, and f is the sampling frequency. The background noise is simulated using Gaussian white noise, which can be characterized by its mean and standard deviation.

Figure 19:
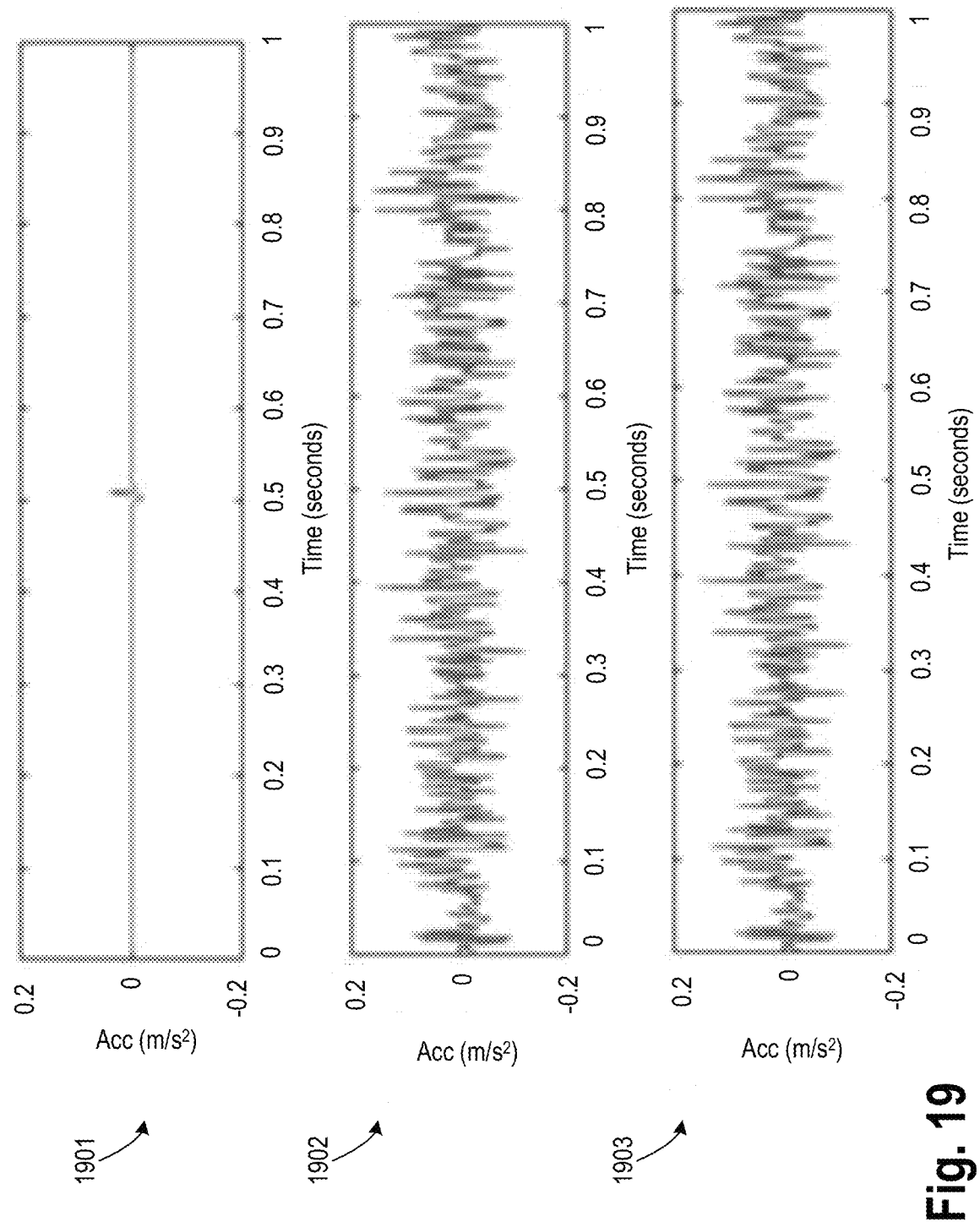
FIG. 19 illustrates waveforms of constructed signal with signal-to-noise ratio (SNR)=1.5: (a) single impact with $\xi=0.007$ and $f=512$ Hz; (b) Gaussian white background noise with zero-mean and 0.05 standard deviation; (c) mixed signal, in accordance with some embodiments.

FIG. 19 illustrates waveforms of constructed signal with SNR=1.5: (a) waveform 1901 of single impact with $\xi$=0.007 and f=512 Hz; (b) Waveform 1902 of Gaussian white background noise with zero-mean and 0.05 standard deviation; and (c) waveform 1903 of mixed signal. A total number of 10,000 independent examples (5,000 with impact and 5,000 without impact) are simulated for each level of SNR. The SVM model is built using 10-fold cross-validation and evaluated by traditional evaluation methods including:

$$\text{Accuracy} = \frac{TP + TN}{TP + TN + FP + FN}, \quad (16)$$

$$\text{Precision} = \frac{TP}{TP + FP}, \quad (17)$$

$$\text{Recall} = \frac{TP}{TP + FN}, \quad (18)$$

where TP, TN, FP, and FN are true positive, true negative, false positive, and false negative events, respectively.

Figure 20:
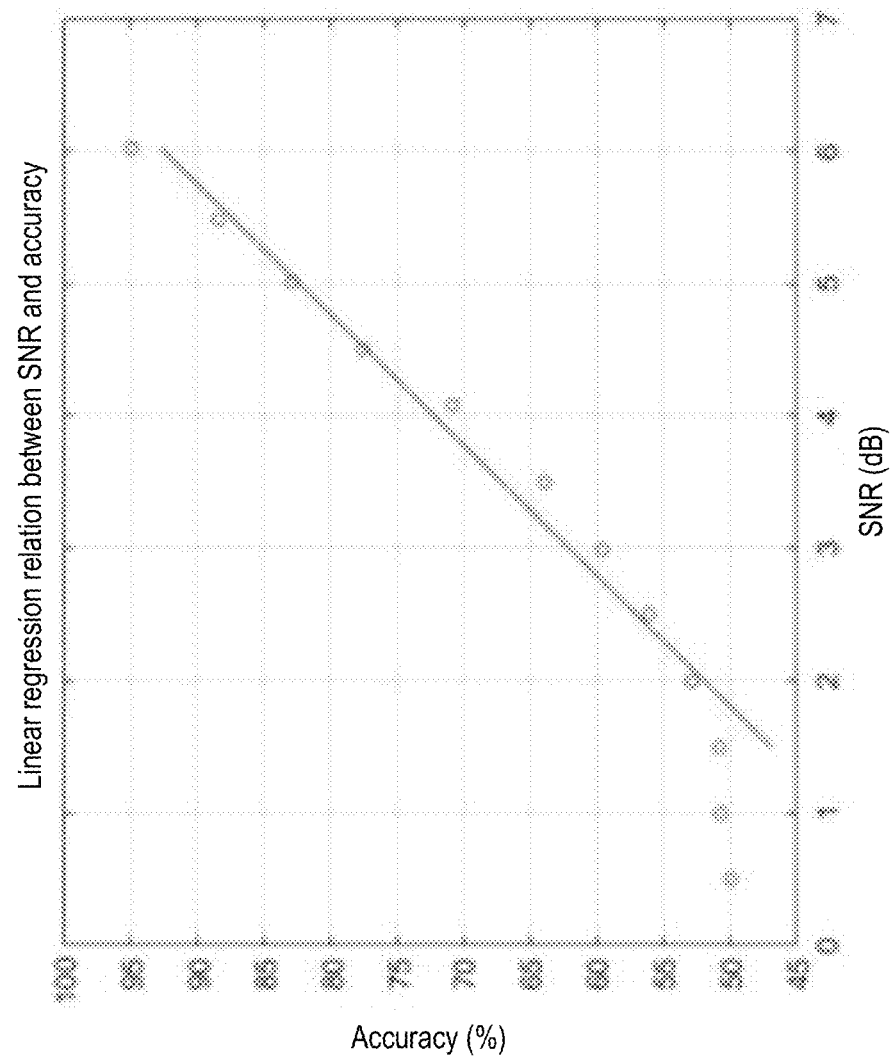
FIGS. 20-22 illustrate relationships between SNR and accuracy.

FIG. 19 and FIG. 20 show the relationships between SNR and accuracy, and between SNR and precision, respectively. In both plots, the first three data points (e.g., SNR<2) are considered as outliers since an approximate of 50% or less detection rate in a binary classification case indicates nothing more than a random guess. In other words, the predictive model is under fitting when the impact signal is too small. For SNR≥2, both plots exhibit linear regression relationships between SNR and accuracy, SNR and precision, respectively. As expected, the overall performance of the predictive model increases as the SNR increases.

Figure 21:
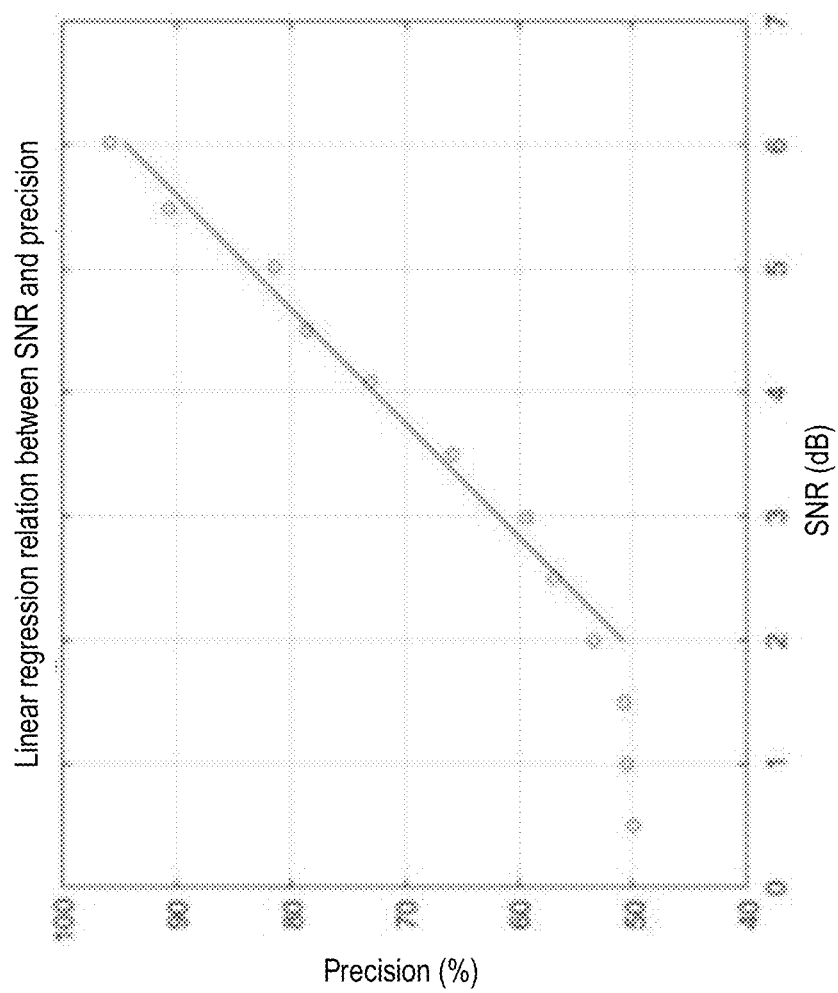
Figure 22:
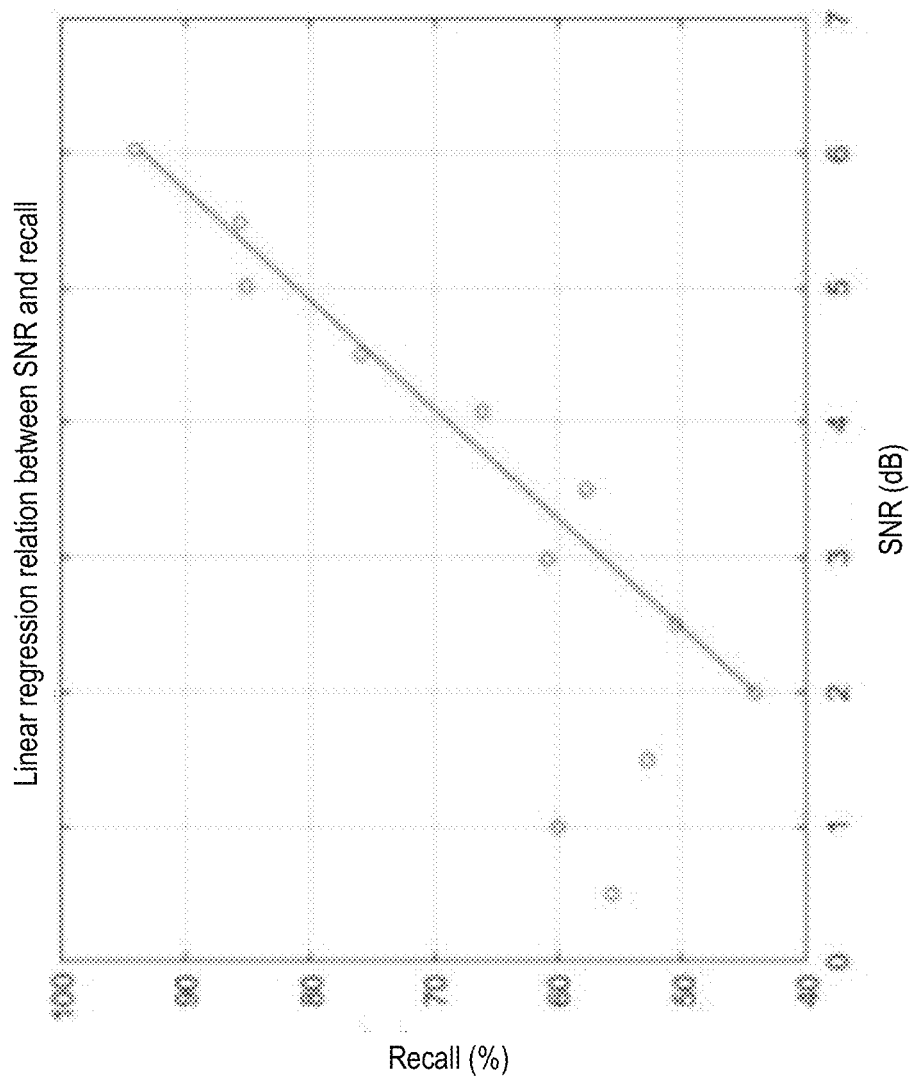

FIGS. 20-22 illustrate plots 200, 2100, and 2200, respectively, of relationships between SNR and accuracy. Each point represents the resultant of 10,000 independent examples. It is noted that in the case of avian species interacting with wind turbines, the detection of impact is crucial for the purpose of bird protection since data and images for event confirmation and species recognition will only be available when the system is triggered. That means the detection system will prefer to detect all actual impacts (i.e., TP plus FN) but can allow some tolerance in the accuracy of non-impact event detection.

FIG. 21 shows the relationship between SNR and recall. The first three data points are still considered as outliers despite a detection rate slightly over 50%. For SNR≥2, the plot also exhibits linear regression relationships between SNR and recall, which is inconsistent with the results of performance evaluated by accuracy and precision.

Various embodiments demonstrate through both experimentation and simulation the feasibility of impact detection using a SVM model applied to vibration data collected by vibration sensors on wind turbine blades. Field tests are performed on full-scale wind turbines in real operating conditions with simulated bird impact on blades. Fourteen out of twenty nine registered artificial impacts are identified on-site by visual inspection and signal processing using the short-time Fourier transform on raw vibration signal time histories, which corresponds to a 48.3% success rate. It elucidates that SNR, together with a fast post-processing technique to discern the spike caused by the impact from the normal vibration background, are critical for real-time automatic impact detection on wind turbine blades. It is necessary to perform simulated studies because bird impacts are rare. Simulated studies also allow the performance evaluation of SVM model on lower SNRs, which is not feasible using field testing data since the impact signals are usually indistinguishable. It can be concluded from simulated studies that the SVM model trained by the eighteen features extracted from raw vibration time histories and TMI graph can reliably predict whether a sample signal contains an impact or not, with an overall accuracy, precision and recall higher than 95% when SNR≥6.

In some embodiments, infrared cameras are used in addition to and/or instead of visual cameras. In some embodiments, image processing is performed to identity the impacted object. The cameras constantly record data in memory in a round-robin fashion in a non-volatile or volatile memory. As soon as an impact is detected by the one or more sensors, video or image content for a period of time before and after the impact is retrieved from the memory. The rest of the data is discarded or overwritten by constant saving of video and/or image. In some embodiments, artificial intelligence (AI) and/or machine learning is used to determine sensitivity of the system.

For example, sensitivity of sensors can be adjusted using AI so that impacts from small and large birds can be determined/identified in the presence of inherent vibration and noise of the blades. As such, the sensors can filter system vibrations and filter "false impacts" from real impacts. For instance, AI helps in understanding normal vibrations from real impacts. In some embodiments, AI is used to tune machine-learning models from various wind turbines and uses this collective data to improve the sensitivity of the sensors. In some embodiments, when an impact on one wind turbine is detected, this information may be relayed to other wind turbines to adjust the speed of the rotation of blades of other wind turbines. For example, other wind turbines are informed of incoming flock of birds so the wind turbines can alter their rotation frequency to reduce the number of possible impacts.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

Following examples are provided that illustrate the various embodiments. The examples can be combined with other examples. As such, various embodiments can be combined with other embodiments without changing the scope of the invention.

Example 1

A first apparatus comprising: a first circuitry to capture and store a series of images or video of a blade of a wind turbine; a memory to store the images from the first circuitry; one or more sensors to continuously sense vibration of the blade or for acoustic recordings; a second circuitry to analyze a data stream from the one or more sensors and/or the stored series of images of video, and to apply machine-learning or statistical analysis to the data stream from the one or more sensors; and a communication interface to transmit data from the second circuitry to a second apparatus.

Example 2

The first apparatus of claim 1, wherein the second circuitry is to determine when an object likely struck the blade.

Example 3

The first apparatus of claim 2, wherein the second circuitry is to save a portion of the data stream that indicates when the object likely struck the blade.

Example 4

The first apparatus of claim 3, wherein the second circuitry is to discard another portion of the data stream that does not indicate when the object likely struck the blade.

Example 5

The first apparatus of claim 1, wherein the first circuitry includes one or more of: a visual camera, or an infrared camera, and wherein the visual camera or the infrared camera are installed on the blade of the wind turbine.

Example 6

The first apparatus of claim 1, wherein the first circuitry is to reuse memory space to store the series of images or video of the blade.

Example 7

The first apparatus of claim 1 comprises a battery to power the first circuitry, the second circuitry, the memory, the one or more sensors, and the communication interface.

Example 8

The first apparatus of claim 1 comprises a power supply connected with a power system in a hub of the wind turbine.

Example 9

The first apparatus of claim 1, wherein the one or more sensors include one or more of: a 3-axis accelerometer, a piezoelectric contact microphone, gyroscope, or one or more sensors for acoustic recordings.

Example 10

The first apparatus of claim 1, wherein the communication interface includes one of Bluetooth, Wi-Fi, 5G, or LTE.

Example 11

The first apparatus of claim 1, wherein the one or more sensors includes a vibration sensor, which is to trigger the first circuitry to capture the image.

Example 12

The first apparatus of claim 1, wherein the second apparatus is in a cloud, and wherein the second circuitry is to: pre-process the data stream with continuous wavelet transform (CWT); generate a time marginal integration (TMI) graph by calculating the energy distribution in the CWT with respect to time; and extract features from the TMI graph.

Example 13

A non-tangible machine-readable storage medium having machine-readable storage instructions that, when executed, cause one or more machines to perform a method comprising: capturing a series of images or video of a blade of a wind turbine; storing the series of images or video in a memory; continuously sensing, by one or more sensors, vibration of the blade or for acoustic recordings; analyzing a data stream from the one or more sensors and/or the stored images or video by applying machine-learning or statistical analysis to the data stream from the one or more sensors; identifying from the analyzed data stream and the applied machine-learning when an object struck the blade; saving a portion of the data stream indicative of when the object struck the blade; and transmitting the portion of the data stream to a device.

Example 14

The non-tangible machine-readable storage medium of claim 13 having machine-readable storage instructions that, when executed, cause the one or more machines to perform the method comprising: discarding another portion of the data stream that does not indicate when the object likely struck the blade; and reusing memory space to store the series of images or video of the blade.

Example 15

The non-tangible machine-readable storage medium of claim 13, wherein analyzing the data stream from the one or more sensors by applying machine-learning to control sensitivity of the one or more sensors, comprises: pre-processing the data stream with continuous wavelet transform (CWT); generating a time marginal integration (TMI) graph by calculating the energy distribution in the CWT with respect to time; and extracting features from the TMI graph.

Example 16

The non-tangible machine-readable storage medium of claim 13, wherein transmitting the portion of the data stream to the device is via one of Bluetooth, Wi-Fi, 5G, or LTE.

Example 17

A method comprising: capturing a series of images or video of a blade of a wind turbine; storing the series of images or video in a memory; continuously sensing, by one or more sensors, vibration of the blade or for acoustic recordings; analyzing a data stream from the one or more sensors and/or the stored images or video by applying machine-learning or statistical analysis to the data stream from the one or more sensors; identifying from the analyzed data stream and the applied machine-learning when an object struck the blade; saving a portion of the data stream indicative of when the object struck the blade; and transmitting the portion of the data stream to a device.

Example 18

The method of claim 18 comprising discarding another portion of the data stream that does not indicate when the object likely struck the blade.

Example 19

The method of claim 18, wherein the one or more sensors include one or more of: a 3-axis accelerometer, a piezoelectric contact microphone, gyroscope, one or more sensors for acoustic recordings, or a vibration sensor, which is to trigger the first circuitry to capture the image.

Example 20

The method of claim 18, wherein analyzing the data stream from the one or more sensors by applying machine-learning to control sensitivity of the one or more sensors, comprises: pre-processing the data stream with continuous wavelet transform (CWT); generating a time marginal integration (TMI) graph by calculating the energy distribution in the CWT with respect to time; and extracting features from the TMI graph.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

What is claimed is:

1. A first apparatus comprising:
   a first circuitry to capture and store a series of images or video of an object struck by a blade of a wind turbine;
   a memory to store the series of images or video from the first circuitry;
   one or more sensors to continuously sense vibration of the blade or for acoustic recordings;
   a second circuitry to analyze a data stream in real-time from the one or more sensors and/or the stored series of images or video, and to apply machine-learning or statistical analysis to the data stream from the one or more sensors, wherein the machine-learning or the statistical analysis identifies a time instance of when the blade struck the object despite the object not leaving a surface defect on the blade; and
   a communication interface to transmit data from the second circuitry to a second apparatus, wherein the second apparatus is in a cloud, and wherein the second circuitry is to:
   pre-process the data stream with continuous wavelet transform (CWT);
   generate a time marginal integration (TMI) graph by calculating an energy distribution in the CWT with respect to time; and
   extract features from the TMI graph.

2. The first apparatus of claim 1, wherein the second circuitry is to determine when the blade likely struck the object.

3. The first apparatus of claim 1, wherein the second circuitry is to save a portion of the data stream that indicates when the blade likely struck the object.

4. The first apparatus of claim 3, wherein the second circuitry is to discard another portion of the data stream that does not indicate when the blade likely struck the object.

5. The first apparatus of claim 1, wherein the first circuitry includes one or more of: a visual camera, or an infrared camera, and wherein the visual camera or the infrared camera are installed on the blade of the wind turbine.

6. The first apparatus of claim 1, wherein the first circuitry is to reuse memory space to store the series of images or video of the object struck by the blade.

7. The first apparatus of claim 1 comprises a battery to power the first circuitry, the second circuitry, the memory, the one or more sensors, and the communication interface.

8. The first apparatus of claim 1 comprises a power supply connected with a power system in a hub of the wind turbine.

9. The first apparatus of claim 1, wherein the one or more sensors include one or more of: a 3-axis accelerometer, a piezoelectric contact microphone, gyroscope, or one or more sensors for acoustic recordings.

10. The first apparatus of claim 1, wherein the communication interface includes one of Bluetooth, Wi-Fi, 5G, or LTE.

11. The first apparatus of claim 1, wherein the one or more sensors includes a vibration sensor, which is to trigger the first circuitry to capture an image of the series of images.

12. A non-transitory machine-readable storage medium having machine-readable storage instructions that, when executed, cause one or more machines to perform a method comprising:
    capturing a series of images or video of an object struck by a blade of a wind turbine;
    storing the series of images or video in a memory;
    continuously sensing, by one or more sensors, vibration of the blade or for acoustic recordings;
    analyzing a data stream from the one or more sensors and/or the stored series of images or video by applying machine-learning or statistical analysis to the data stream from the one or more sensors;
    identifying from the analyzed data stream and the applied machine-learning or statistical analysis when the blade struck the object, wherein the machine-learning or the statistical analysis identifies a time instance of when the blade struck the object despite the object not leaving a surface defect on the blade; and
    transmitting a portion of the data stream to a device, wherein the device is to record an image of the object, wherein analyzing the data stream from the one or more sensors by applying machine-learning to control sensitivity of the one or more sensors, comprises:
    pre-processing the data stream with continuous wavelet transform (CWT);
    generating a time marginal integration (TMI) graph by calculating an energy distribution in the CWT with respect to time; and
    extracting features from the TMI graph.

13. The non-transitory machine-readable storage medium of claim 12 having further machine-readable storage instructions that, when executed, cause the one or more machines to perform the method comprising:

discarding another portion of the data stream that does not indicate when the blade likely struck the object; and reusing memory space to store the series of images or video of the object.

14. The non-transitory machine-readable storage medium of claim 12, wherein transmitting the portion of the data stream to the device is via one of Bluetooth, Wi-Fi, 5G, or LTE.

15. A method comprising:

capturing a series of images or video of an object struck by a blade of a wind turbine;

storing the series of images or video in a memory;

continuously sensing, by one or more sensors, vibration of the blade or for acoustic recordings;

analyzing a data stream from the one or more sensors and/or the stored images or video by applying machine-learning or statistical analysis to the data stream from the one or more sensors;

identifying from the analyzed data stream and the applied machine-learning or the statistical analysis when the blade struck the object, wherein the machine-learning or the statistical analysis identifies a time instance of when the blade struck the blade despite the object not leaving a surface defect on the blade; and transmitting a portion of the data stream to a device, wherein analyzing the data stream from the one or more sensors by applying machine-learning to control sensitivity of the one or more sensors, comprises:

pre-processing the data stream with continuous wavelet transform (CWT);

generating a time marginal integration (TMI) graph by calculating an energy distribution in the CWT with respect to time; and extracting features from the TMI graph.

16. The method of claim 15 comprising discarding another portion of the data stream that does not indicate when the blade likely struck the object.

17. The method of claim 15, wherein the one or more sensors include one or more of: a 3-axis accelerometer, a piezoelectric contact microphone, gyroscope, one or more sensors for acoustic recordings, or a vibration sensor, which is to trigger capturing of an image of the series of images.

* * * * *